US009832265B2

(12) United States Patent
Hoarau et al.

(10) Patent No.: US 9,832,265 B2
(45) Date of Patent: Nov. 28, 2017

(54) SYSTEMS AND METHODS FOR SYNCHRONIZING INTEGRATIONS IN A COLLABORATION PLATFORM

(71) Applicant: ATLASSIAN PTY LTD, Sydney (AU)

(72) Inventors: Julien Hoarau, Neutral Bay (AU); Michael Oates, St. Leonards (AU); Patrick Streule, Surry Hills (AU)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 15/349,739

(22) Filed: Nov. 11, 2016

(65) Prior Publication Data

US 2017/0289247 A1 Oct. 5, 2017

Related U.S. Application Data

(63) Continuation of application No. 15/087,942, filed on Mar. 31, 2016, now Pat. No. 9,497,267.

(51) Int. Cl.
| | | |
|---|---|---|
| G06F 15/16 | (2006.01) | |
| H04L 29/08 | (2006.01) | |
| H04L 29/06 | (2006.01) | |

(52) U.S. Cl.
CPC .......... H04L 67/1095 (2013.01); H04L 67/42 (2013.01)

(58) Field of Classification Search
CPC .................................................. H04L 67/1095
See application file for complete search history.

(56) References Cited

U.S. PATENT DOCUMENTS

| | | | |
|---|---|---|---|
| 2003/0126301 A1 | 7/2003 | Mason | |
| 2004/0054740 A1* | 3/2004 | Daigle | ................. G06Q 10/107 709/206 |
| 2015/0288760 A1* | 10/2015 | Thomas | .............. H04L 67/1095 709/203 |

OTHER PUBLICATIONS

U.S. Appl. No. 15/087,942, filed Mar. 31, 2016, Notice of Allowance, dated Jul. 13, 2016.

* cited by examiner

*Primary Examiner* — Esther B Henderson
(74) *Attorney, Agent, or Firm* — Hickman Palermo Becker Bingham LLP

(57) ABSTRACT

Described herein is a computer implemented method for operating a collaboration system to synchronize integrations installed on a client device with integrations stored by the collaboration system. The method comprises: receiving a synchronization request from the client device and, for a given integration included in the synchronization request: retrieving a system integration token and comparing a client integration token received in the request with the system integration token. Responsive to determining that the client and system integration tokens do not match, the method further comprises determining the client to be out of date with respect to the given integration and sending an integration update to the client device.

19 Claims, 23 Drawing Sheets

SYSTEMS AND METHODS FOR SYNCHRONIZING INTEGRATIONS IN A COLLABORATION PLATFORM

BENEFIT CLAIM

This application claims the benefit under 35 U.S.C. §120 as a continuation of application Ser. No. 15/087,942, filed Mar. 31, 2016, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2015-2016 Atlassian Pty Ltd.

TECHNICAL FIELD

Aspects of the present disclosure are directed to collaboration platforms, and in particular to collaboration platforms that support integrations.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Many modern workplaces are increasingly encouraging employee collaboration. Such collaboration relies on effective communication among co-workers. Various tools are available to assist with collaboration efforts, such as collaboration platforms that facilitate instant messaging (IM) between users, either as a complement to email or as its replacement. Instant messaging applications are also used by groups of people to enable communication for social purposes.

In order to increase functionality of collaboration platforms can be integrated with other systems or services by the use of integrations (also referred to as plug-ins or add-ons). For example, some collaboration platforms let users to subscribe to various third party applications or create their own proprietary applications to add into their groups.

As the number of integrations supported by a collaboration platform increases, so too does the complexity of ensuring all clients are synchronized. As the collaboration system is used, content providers will provide new integrations that can be installed on clients, update existing integrations, and delete previously provided integrations. End-users of the collaboration system can create rooms (e.g. chat groups), change the memberships of those rooms, add integrations to a given room, and remove integrations from a given room. Tracking which clients have which versions of which installations installed, and ensuring this is kept up to date (synchronized) as room membership changes and as integrations are updated by content providers, deleted by content providers, added to rooms, and removed from rooms is challenging.

SUMMARY

The appended claims may serve as a summary of the invention.

DETAILED DESCRIPTION

Figure 1:
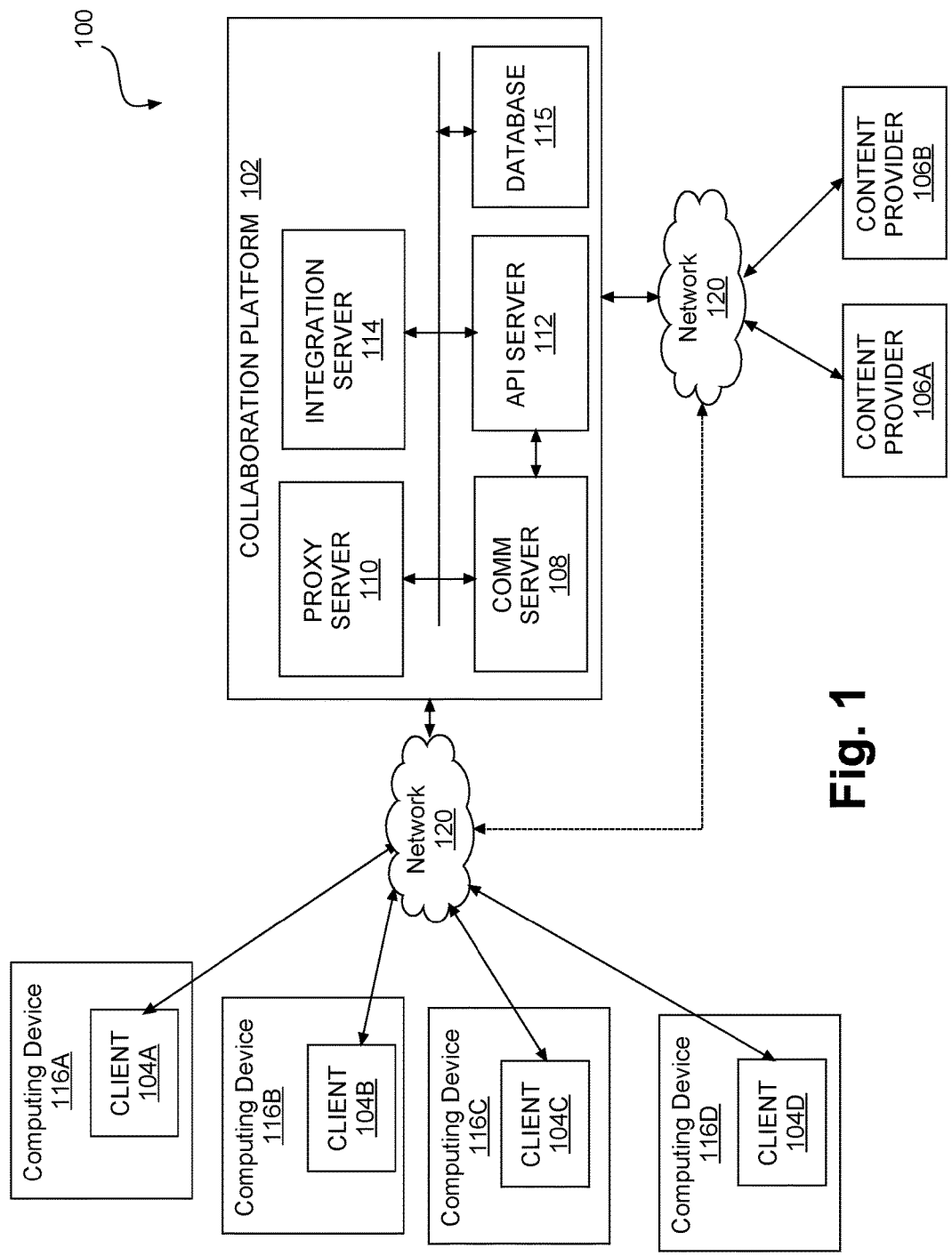
FIG. 1 is a block diagram of an exemplary collaboration network according to aspects of the present disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

The description follows the following outline:
a. Overview
1.1 Example System Architecture
1.2 General Collaboration Network Operations
b. Dynamic content items
2.1 Context
2.2 Implementation
    2.2.1 Installing Integrations and Displaying Dynamic Content Items
        2.2.1.1 Collaboration Platform Operation
        2.2.1.2 Client Operation
        2.2.1.3 Content provider Operation
    2.2.2 Process for updating dynamic content of dynamic content items
        2.2.2.1 Content provider operation
        2.2.2.2 Collaboration platform operation
        2.2.2.3 Client operation
2.3 Clauses
3. Conditional controls
3.1 Context
3.2 Implementation
    3.2.1 Process for Rendering Conditional controls
        3.2.1.1 Collaboration Platform Operation
        3.2.1.2 Client Operation
3.3 Clauses
4. Integration Synchronization
4.1. Context
4.2. Implementation
    4.2.1 Client-initiated Integration Synchronization
        4.2.1.1 Client Operation
        4.2.1.2 Collaboration Platform Operation
    4.2.2 Server-initiated Integration Synchronization
        4.2.2.1 Collaboration Platform Operation
        4.2.2.2 Client Operation
4.3 Clauses
5. Hardware overview
1. Overview A collaboration platform typically enables social networking capabilities. One such capability is instant messaging (or simply messaging) which allows users to share information.

To support messaging, a collaboration platform may provide chat clients that run on users' computing devices. A chat client renders one or more chat interfaces in which users can receive messages from other users, send messages to other users, and view information about the users communicating in that interface.

A chat interface may correspond to a particular chat room (or simply room) the user has subscribed to/is a member of Generally speaking, a room is a user interface that includes two or more members (i.e. users of the collaboration platform) that are connected via a shared interest, such as a common project, a common team, or a common extracurricular activity. A chat client can support multiple rooms that may have different members depending on the room interest. Users can create rooms, join rooms or invite particular users to their rooms. Furthermore, rooms can be public (i.e., open to anyone to join) or private (open to only certain people). Whenever the user wishes to participate in a particular room (e.g. to read and/or post messages), the user can select that room, which causes the client to render the corresponding chat interface for that room. The rendered chat interface typically displays the most recent messages exchanged between the members of the room, allows the user to view historical messages posted to the room, and displays information re the members/participants of the room (e.g. who the members are and their current status—online, offline, away, etc.).

Aspects of the present disclosure are related to collaboration platforms that support integrations (which may also be referred to as add-ons or plug-ins). One example of such a collaboration platform is HipChat which is commercially available from Atlassian Pty Ltd. Although reference to HipChat is made in this disclosure, the features and techniques described herein can be applied to any other collaboration platform or system which provides a messaging capability.

Specifically, according to aspects of the present disclosure, the collaboration platform 102 allows users to add integrations in their chat interfaces. An integration may be added in the chat interface of all users within an organization (a global integration), or in chat interfaces of specific rooms. As described in detail below, integrations may operate to provide one or more user interface (UI) extensions. The present disclosure describes the installation of integrations, the synchronization of integrations, and integrations which provide the following UI extensions: dynamic content items (and related content) and conditional controls.

A dynamic content item depicts information about an underlying system or service which the integration integrates with. The dynamic content item is displayed in a manner that makes it distinct from the messages being exchanged in the chat room (e.g. in a dynamic content item area that is separate to/distinct from a messaging area). This allows integrations to present users with summary and/or other information with respect to the underlying system/service in a way that does not rely on notifications in the actual chat dialogue, which can be missed by a user and/or difficult to find at a time after the actual notification has been posted.

Conditional controls allow integrations to surface potentially useful controls for users to allow users to perform certain actions on messages or objects directly from a chat room. The conditional controls are based on certain conditions which operate to present users with controls relevant to the content in the chat interface.

1.1 Example System Architecture

FIG. 1 illustrates an exemplary collaboration network 100 in which aspects of the present disclosure may be implemented.

The collaboration network 100 includes a collaboration platform 102 in communication with clients 104 (in this instance clients 104a, 104b, 104c, and 104d), and content providers 106 (in this instance 106a and 106b). While only four clients and two content providers are depicted in FIG. 1, it will be appreciated that in an actual implementation the collaboration platform 102 can support many more clients 104 and content providers 106.

The collaboration platform 102, clients 104, and content providers 106 communicate with each other directly or indirectly through one or more communications networks 120. For example, the clients 104 may communicate with the collaboration platform 102 through a local area network (LAN) of an enterprise in one embodiment. In this case the collaboration platform 102 may be implemented as an on-premises solution in which the collaboration platform 102 and computing devices 116 are associated with the same business enterprise. In another embodiment, network 120 may represent a public internetwork and the collaboration platform 102 may be located off-premises with respect to an organization, such as in a shared data center or cloud computing facility. Similarly, the content providers 106 may communicate with the collaboration platform via a local or public communication network and with the clients via the same network or a different local communication network or public communication network.

Each client 104 is a software application that accesses a collaboration server application made available by the collaboration platform 102. Each client 104 is hosted on client computing device 116 (or electronic device). Client device 116 may be any suitable device, for example a mobile device (e.g. a tablet or mobile phone), a portable device (such as laptop computer), or any other computing device (e.g. a desktop computer). A client 104 includes instructions and data stored in the memory (e.g. non-transient compute readable media) of the computing device 116 on which the client is installed/run. These instructions are executed by the processor of the computing device 116 to perform various functions as described herein. By way of example, some functions performed by the client 104 include rendering chat interfaces, rendering content within the chat interfaces, allowing users to post messages to chat rooms, and synchronizing data stored in the memory of the computing device with data stored in the collaboration platform.

A client 104 may be implemented in various ways. For example, a client 104 may be web browser application (such as, for example, Chrome, Safari, Internet Explorer, Opera) which accesses the collaboration platform 102 via an appropriate uniform resource locator (URL) and communicates with the collaboration platform via general world-wide-web protocols (e.g. HTTP, HTTPS, FTP). In this case the client web browser application is configured to request, render and display chat interfaces that conform to a markup language such as HTML, XML or extensions, and may be capable of internally executing browser-executable code such as JAVASCRIPT, or other forms of code. Alternatively, a client 104 may be a specific application programmed to communicate with the collaboration platform 102 using defined application programming interface (API) calls.

A content provider 106 creates or provides integrations which can be installed by clients 104. Integrations monitor or plug into underlying services or applications provided by content (or service) providers. Generally speaking, an integration may provide a mechanism for a service/content provider to communicate information directly to a chat interface and/or allow a user to perform one or more functions offered by an underlying application/system (provided by the service/content provider) directly from the chat interface. An integration may facilitate integration with any desired system or application, for example a stock exchange system, a weather bureau system, application building software, a service desk system, a file management system, etc.

As one specific example, an integration may integrate with a social media system (e.g. Facebook® or Twitter®). In this case the integration may allow the social media service to communicate directly with the client, for example to publish content regarding the social media content in a chat interface. Such an integration may also (or alternatively) allow a user of a chat interface to directly perform various functions made available by the social media system through the chat interface (e.g. to post content from a particular chat room directly to a particular social media account).

In a further example, an integration may integrate with an issue tracking system (such as Jira, commercially available from Atlassian Ply Ltd). In this case, the integration may allow the issue tracking system to post events/information (e.g. new issues being logged, issue status changing etc.) directly to a particular chat room. The integration may also (or alternatively) allow a user of a chat interface to perform operations offered by the issue tracking system directly from the chat interface (e.g. to create an issue, change an issue status, assign an issue to a particular person etc.).

According to aspects of the present disclosure, collaboration platform 102 (and clients 104) are configured to enable content providers 106 to define UI extensions in the form of dynamic content items for display by clients 104, and to provide dynamic data for display in those dynamic content items. Dynamic content items can be used, for example, to provide aggregate information about the underlying service or application in a readily viewable summarized format. For instance, in the example of the social media integration mentioned above, the content provider may provide dynamic data for a dynamic content item which displays a summary of the number of unread posts in the group's social media account, the number of positive or negative posts in the group's social media account, and/or any other such summarized information.

Furthermore, the collaboration platform 102 (and clients 104) may be configured to enable a content provider 106 to generate related content for display by a client 104, the related content being related to a dynamic content item and providing additional information with respect to that item. For example, in the case of a dynamic content item that provides a summary of the number of negative posts in a group's social media account, the content provider 106 may create related content including a list of the negative posts and their senders.

In some aspects, collaboration platform 102 (and clients 104) are also (or alternatively) configured to enable content providers 106 to define UI extensions in the form of conditional controls that can be invoked from a chat interface. For instance, a content provider 106 may provide data for conditional controls, which are offered to a user by the client 104 based on fulfilment of certain conditions. For instance, a content provider 106 may provide data for a conditional control that is displayed when the content of a message in a chat interface matches a predetermined string or phrase.

Content providers 106 may create integrations which define UI extensions using any appropriate programming language and web framework. To integrate these UI extensions with the collaboration platform 102, a content provider 106 may provide an integration descriptor to the collaboration platform 102, the integration descriptor including information in respect of the integration as well as details with respect to any UI extensions—i.e. any dynamic content items, related content, and conditional controls. In one example, the information is forwarded in an integration descriptor that is created using the JavaScript Objection Notation (JSON) format. It will be appreciated that any other format may be utilized for creating the information or its integration descriptor. For example, Extensible Markup Language (XML) may be utilized without departing from the scope of the present disclosure.

The collaboration platform 102 allows users 118 to send messages to each other, join/create groups, transfer files, participate in audio/video calls, and the like through the clients 104. Further, the collaboration platform 102 is configured to connect content providers 106 with clients 104, allowing content providers 106 to deliver integrations, dynamic content items, related content, and conditional controls to the clients 104. To that end, the collaboration platform 102 includes a communication server 108, an application programming interface (API) server 112 and an integration server 114. Where clients 104 are hosted on mobile computing devices 116, the collaboration platform 102 also includes a proxy server 110. In addition to these servers, the platform 102 may also include application programs, libraries, APIs or other software elements that implement the features and functions that are further described herein. For instance, the collaboration platform 102 may include a database 115 for storing information about integrations (including any dynamic content items, related content, and conditional controls), different chat rooms created by users, integrations installed in rooms, clients connected to the collaboration platform 102, user IDs, and so on.

The communication server 108 is configured to offer services required for real time communications, such as message handling and routing, presence detection, security and authorization. When the communication server 108 handles messages between different clients 104, it uses an instant messaging protocol, such as Extensible Messaging and Presence Protocol (XMPP). It will be appreciated that any other instant messaging protocol such as Zephyr Notification Service, TOX, or Session Initiation Protocol (SIP) may be used instead without departing from the scope of the present disclosure.

The proxy server 110 is configured to maintain dedicated connections with active clients 104. 'Active clients' as used herein, refers to clients that are involved in a chat session with one or more users and have at least one open chat interface. In one embodiment, the proxy server 110 may utilize bidirectional-streams over synchronous HTTP (BOSH) transport protocol for communicating with the communication server 102 and the clients 104. The proxy server is also configured to forward the connection information to the communication server 108, which in turn maintains a connections data structure (e.g., in the form of a connections table) in the database 115. The connections table stores the persistent connections of the active clients.

Table A illustrates an exemplary connections table that stores the connections of active clients.

TABLE A

| Connections table | |
|---|---|
| Client identifier | Proxy connection |
| 623916 | 2 |
| 269318 | 5 |
| 287639 | 6 |
| . . . | . . . |

The API server 112 is configured to provide an interface between the clients 104 and the collaboration platform 102 and between the content providers 106 and the collaboration platform 102. Specifically, the API server 112 allows the clients and content providers to communicate with the collaboration platform over open web protocols such as (HTTPS, REST, and JWT). In some aspects the API server 112 receives update, installation or uninstallation requests from clients 104 and receives integration information from content providers 106. The API server 112 is configured to forward these requests and information to the integration server 114 or the communication server 108. In one embodiment, the API server 112 is based on the Representational State Transfer (REST) architectural style. Alternatively, it may be based on the Simple Object Access Protocol (SOAP) architecture.

The routines, protocols and tools that content providers can utilize to generate integration information can be found in the application libraries and API's hosted by the collaboration platform 102. The API's may be released as part of a software development kit (SDK) or as an open API published on the Internet.

The integration server 114 is configured to receive data or requests from the API server 112 and respond to these requests by forwarding data to the communication server 108. To facilitate this, the integration server 114 is configured to store integration information in the database 115, for example in an integration data structure. In certain embodiments, the integration data structure is a table which stores, for each integration, a unique identifier (e.g. a key) for the integration, an integration descriptor providing details of the integration and its capabilities.

Table B below shows one example of an integration data structure (in this case an integration table):

TABLE B

| Example integration data structure | |
|---|---|
| Integration key | Integration descriptor |
| Integration 1 | <descriptor of int. 1> |
| Integration 2 | <descriptor of int. 2> |
| Integration 3 | <descriptor of int. 3> |
| . . . | . . . |

As described in further detail below, a given integration descriptor may include multiple UI extension descriptors, each defining a UI extension (e.g. a dynamic content item, conditional control, or other UI extension). In certain implementations, each UI extension descriptor included in an integration descriptor is extracted and stored separately in a UI extension data structure. This may be instead of or in addition to storing the integration descriptor as a single entity (as shown in Table B above). One example of a UI extension data structure is shown in Table C below:

TABLE C

Example UI extension data structure

| Unique ID | Integration Key | Name | Extension Type | Extension Descriptor | URL |
|---|---|---|---|---|---|
| 1 | Integration 1 | A'sIntegration1 | Dynamic content item | <extension descriptor> | <URL> |
| 2 | Integration 1 | A'sIntegration1 | Conditional control | <extension descriptor> | <URL> |
| 3 | Integration 2 | B'sIntegration1 | Dynamic content item | <extension descriptor> | <URL> |
| ... | ... | ... | ... | ... | ... |

The integration server 114 is also configured to store chat room information in the database 115, for example in a chat room data structure. In certain embodiments, the room data structure is a room table in which information with respect to at least the live chat rooms is stored. In one example, for each live chat room this information includes, for example, a unique room identifier, who the owner of the room is, and the type of room (e.g. public/private). Table D below provides one example of a room data structure (in this case a table) for storing details with respect to chat rooms:

TABLE D

Example room data structure

| Room identifier | Room owner | Room type |
|---|---|---|
| 123 | aaa | Public |
| 456 | aaa | Private |
| 789 | aaa | Private |
| ... | ... | ... |

The integration server 114 also maintains associations between rooms and users in order to track, for example, which users are members of which rooms (are also needed by the communications server 108 and the API server 112). These associations can be very transient as users can frequently join or leave rooms. Table E provides one example of a data structure for this purpose, in this case a room/user table which maintains a row for each unique room/user pairing:

TABLE E

Example room/user data structure

| Room identifier | User identifier |
|---|---|
| 123 | aaa |
| 123 | bbb |
| 123 | ccc |
| 456 | aaa |
| 456 | ddd |
| ... | ... |

The integration server 114 also maintains associations between rooms and integrations in order to track which integrations have been installed in which rooms. Table F provides an example of a data structure which records which integrations have been installed in which rooms, in this case a room/integration table which maintains a row for each unique room/user pairing.

TABLE F

Example room/integration data structure

| Room identifier | Integration key |
|---|---|
| 123 | Integration 1 |
| 456 | Integration 1 |
| 456 | Integration 6 |
| [None] (indicating global room) | Integration 3 |
| ... | ... |

In the example of Table F, the data structure includes an entry without a room identifier, which is treated as indicating that the associated integration is globally installed (i.e. in all rooms). In alternative embodiments a particular room identifier may be reserved to indicate a globally installed integration.

By querying these tables the collaboration platform 102 can easily determine: which users are members of a particular room; which rooms a particular user is a member of; which integrations are installed in a particular room (and/or which UI extensions are installed in a particular room); and which rooms a particular integration is installed in (and/or which rooms a particular UI extension is installed in). Furthermore, if a UI extension data structure is used, queries can also be run to determine all UI extensions provided by a given integration, all integrations that support a particular UI extension type, etc.

As discussed below, in certain embodiments integration tokens are used to assist with client synchronization. An integration token is associated with a particular integration and provides a unique identifier for a particular version of that integration. The integration token stored by the collaboration platform 102 at a given time reflects the current version of that integration. Integration tokens are stored and associated with a given integration in an appropriate data structure. For example, integration tokens may be stored as a field of an integration data structure (e.g. a field of an integration data structure such as the example shown in Table B above), or in a dedicated integration token data structure as shown in Table G below. The data structure storing the integration token may be stored in database 115, a Redis cache, or in an alternative location accessible to the collaboration platform.

TABLE G

Example integration token data structure

| Integration identifier | Integration token |
|---|---|
| Integration 1 | f3846du3 . . . |
| Integration 2 | h2983gu3 . . . |
| Integration 3 | g2631by8 . . . |
| ... | ... |

As also discussed below, room tokens are also used in certain embodiments to assist with client synchronization. A room token is associated with a particular room and provides a unique identifier with respect to the integration state of a given room: i.e. the particular integrations and particular versions of those integrations that are installed in that room. The room token stored by the collaboration platform 102 at a given time reflects the current integration state of the room. Room tokens are stored and associated with a given room in an appropriate data structure. For example, room tokens may be stored as a field of a room data structure (e.g. a field of a room data structure such as the example shown in Table D above), or in a dedicated room token data structure as shown in Table H below. The data structure storing the room token may be stored in database 115, a Redis cache, or in an alternative location accessible to the collaboration platform.

TABLE H

Example room token data structure

| Room identifier | Room token |
|---|---|
| 123 | a38462ghy . . . |
| 974 | b38462bcd . . . |
| [None]<br>(indicating global room) | b87382cde . . . |
| . . . | . . . |

While example data structures have been provided, it will be appreciated that alternative data structures could be used which include additional, fewer, or alternative fields. Moreover, the data stored by the example data structures may be stored across additional or fewer linked data structures (e.g. a relational database) or, indeed, in a single data structure (e.g. a single table).

One specific example of a collaboration platform 102 is described above. The following description describes embodiments and features with respect to this particular example, but alternative collaboration platforms may be used. For example, the functions provided by the comm server 108, proxy server 110, API server 112, integration server 114, and database 115 may be provided by a single application (or software suite) running on a single physical computing device, a single application (or software suite) running on multiple physical computing devices, multiple applications running on a single physical computing device, or multiple applications running on multiple physical computing devices. Accordingly, where processing is described as being performed by a particular component of the exemplary collaboration system 102 it could equally be described (and should be read as describing) processing being performed by the collaboration system 102.

1.2 General Collaboration Network Operations

This section describes the general manner in which the collaboration platform 102 facilitates messaging between clients 104.

As described previously, a function of the collaboration platform 102 is to allow users to communicate with one another using instant messages. Via a client 104, a user can start a conversation with one or more people—e.g. by selecting a person from a list of available people, by entering an existing chat room, or by creating a new chat room. Based on this selection, the client 104 renders a chat interface on a display of the device 116. Using this interface, the user can create a message (e.g., by typing into an input field/control) and send the message (e.g., by activating a send control). This, in effect, sends the message to all the other active participants in the chat group. When a user is a member of a chat room that receives a message (sent by another user or service), the client 104 of that user's device 106 alerts the user to the new message by rendering a chat interface to display the message to the user or by rendering the message in an already open chat interface.

Figure 2:
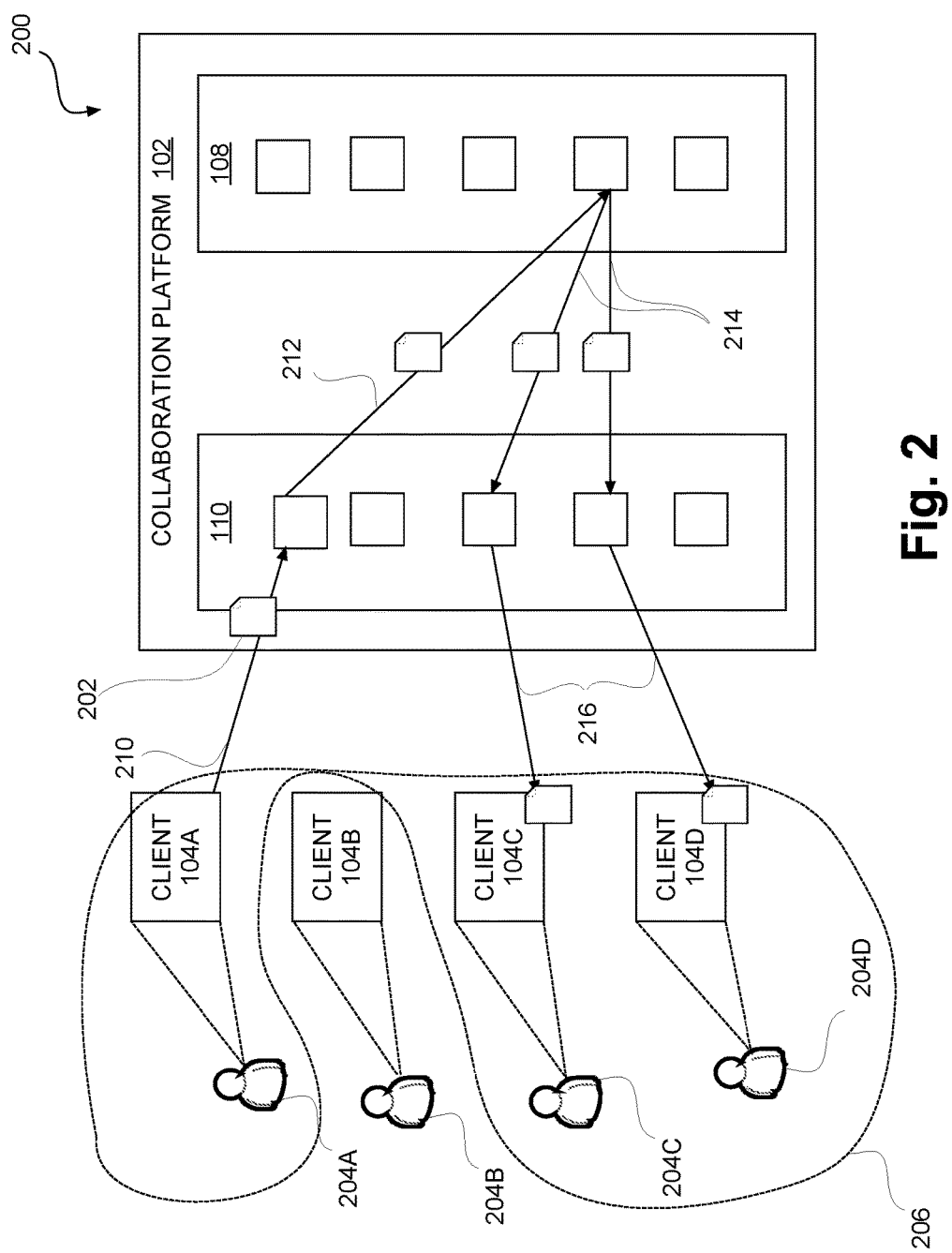
FIG. 2 is a message passing diagram illustrating a process of communicating a message in an instant messaging system.

FIG. 2 illustrates this typical process 200 of "sending" a message 202. In this example, message 202 is sent from user 204a in pre-exiting chat group 206, which users 204a, 204c, and 204d are members of The method 200 commences when the user 204a opens the chat interface corresponding to the chat group 204 in the client 104a, creates, and sends a message.

Once user 204a sends the message, it is transmitted from the client device 104a to the proxy server 110, via the communication network 120 (indicated by arrow 210). In some cases clients 104 may maintain TCP connections directly with the proxy server 110. In other cases, clients may connect with the proxy server 110 using XMPP over HTTP, in which case clients 104 connect to the proxy server 110 via a BOSH server (not shown). The proxy server 110 communicates the message 202 to the communication server 108 (indicated by arrow 212).

The communication server 108, in turn, retrieves a chat room id from the message, and retrieves information about the users in the chat room (e.g., from the connections table). The communication server 108 also retrieves information regarding the persistent connections of the recipients' clients with the proxy server 110 from the database 115. Subsequently, the communication server 108 forwards the message 202 to the identified connections of the proxy server 110 (indicated by arrows 214), which in turn communicates the message to the clients 104c and 104d through the persistent connections (indicated by arrows 216).

During communication, the proxy server 110 maintains dedicated open channels with the client devices 104a, 104c, and 104d. However, when the communication server 108 detects that a user is no longer an active user for the room (e.g. as the user has closed their chat interface/client 104 or disconnected from the collaboration platform 102), the communication server 108 instructs the proxy server 110 to disconnect the dedicated communication channels with the relevant client.

2. Dynamic Content Items

As outlined above, aspects of the present invention enable UI extensions in the form of dynamic content items. Dynamic content items can be defined and updated by content providers 106 and provide a means for displaying aggregate (or other) information about an underlying service in a chat interface. A content provider 106 may configure different dynamic content items for different groups/rooms based on the context of the group/room. Similarly, content providers may be configured to create different dynamic content items for different users. Global dynamic content items may also be created for all users of an organization.

2.1 Context

In various embodiments, the techniques herein address problems that the inventors have identified in the way content providers communicate with clients in conventional collaboration platforms. In known systems, when an integration is installed in a chat room, the integration pushes notifications informing the group each time an event occurs. These notifications are displayed as messages from the content providers within a messaging area of the chat interface.

This technique of displaying notifications can often be problematic or cumbersome. Consider the example where a chat group in an IT company has installed an application-building integration. In the traditional notification approach, the application-building integration would send notifications to the chat group every time a build has failed or succeeded. If the user wishes to know the current status of a particular application being built, the user would have to search through the entire chat history to identify the message relating to that build.

Similarly, consider the example where a chat group has installed an incident reporting integration. In this case, the integration may display notifications whenever an incident status changes. This can be helpful if the status of incidents changes occasionally or if the user religiously follows a conversation in their chat group. However, if that is not the case, a user would be unable to determine how many incidents are open at any given time or drill down into the details of the open incidents using conventional integrations.

Furthermore, given the nature of typical chat interfaces only a certain number of messages can be displayed on screen at a given time. As new messages are received old messages move (for example) further up the screen until they are eventually off screen. As such, if a user receives an important message while they are not paying attention to the chat interface, and several more messages are received before the user returns attention to the interface, the important message may well be off-screen before even being seen by the user.

2.2 Implementation

To overcome one or more of the issues identified above, aspects of the present disclosure provide a collaboration platform 102 that enables dynamic content items to be generated and displayed to users. Dynamic content items can be used, for example, to display aggregate service information instead of piecemeal notifications. Furthermore, the dynamic content items are displayed in an area of a chat interface other than the messaging area, thereby allowing users to readily view the aggregate information at any time without scrolling through the message history.

In certain embodiments, a user can select a dynamic content item in order to display additional related information with respect to that dynamic content item (i.e. drill down into the dynamic content item). The additional information is provided by a content provider 106.

Figure 3:
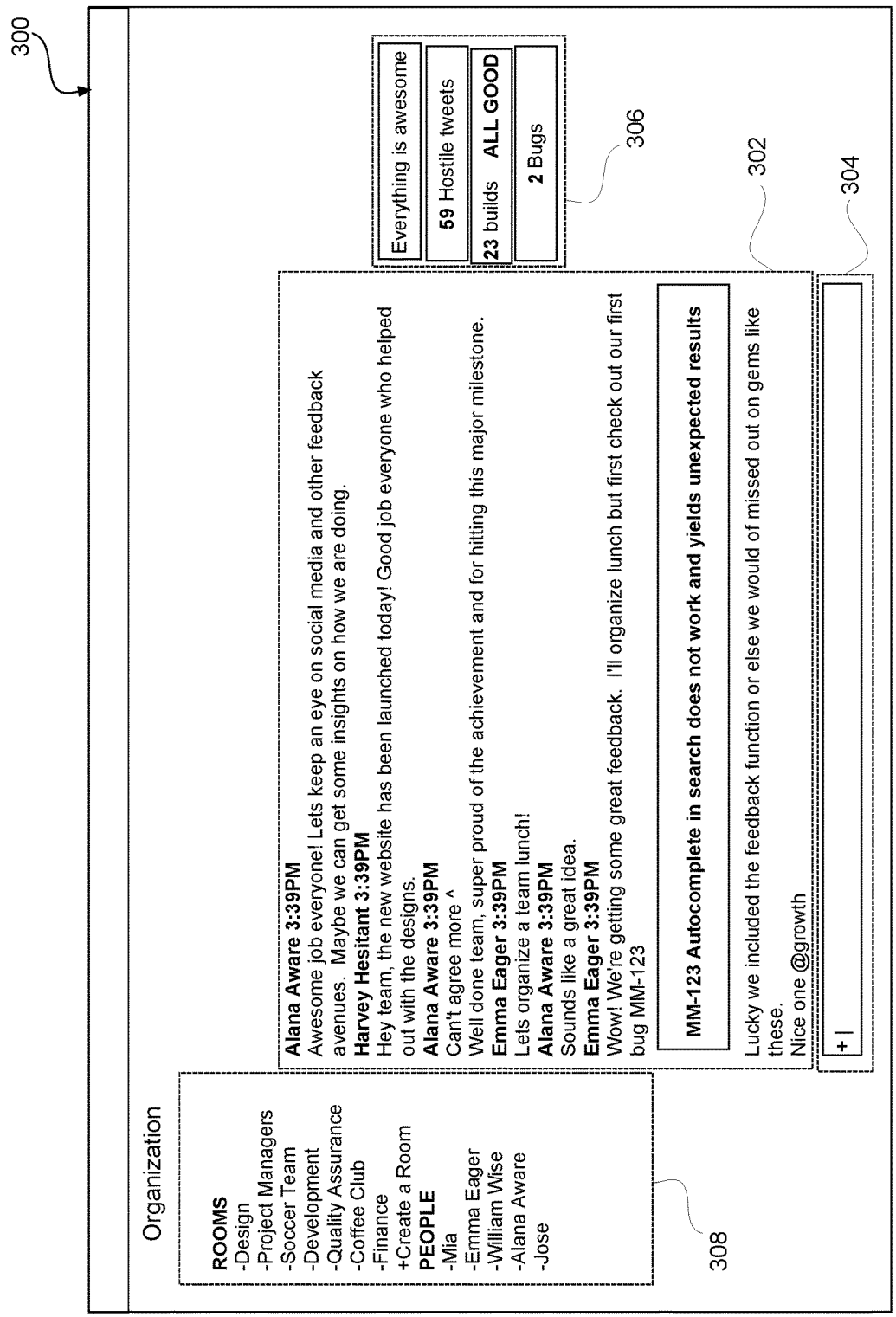
FIG. 3 is a screenshot of an exemplary chat interface including a dynamic content item area according to aspects of the present disclosure.

FIG. 3 illustrates an exemplary chat interface 300 in which dynamic content items are displayed. The chat interface 300 is displayed on a display of a client device 116 by a client 104. The chat interface 300 includes a messaging area 302 that displays received messages (e.g. messages exchanged between members of the group and messages received from integrated systems/services), an input area 304 where a user can create a message, and a dynamic content item area 306 that displays dynamic content items from content providers 106 that the group is integrated with.

It will be appreciated that the positions of the various areas of the chat interface 300 may vary in different implementations. Further, the chat interface 300 may display more or less information without departing from the scope of the present disclosure. For example, the chat interface 300 may also include an information area 308 that displays information about the members of the chat group, the status of the members of the chat group, a list of chat groups that the user is a part of, and the like. As can clearly be seen, in the illustrated embodiment the dynamic content item area 306 is distinct from the messaging area 302, thus ensuring that the information displayed in the dynamic content item area 306 is visible/is not obscured by the messaging area 302.

In the present embodiment, dynamic content items have defined elements which can be used by content providers to display both static and dynamic data. By way of example, the defined elements for a dynamic content item may be icons, lozenges (a UI element with defined colors for denoting particular meanings/statuses), and labels (of a particular format, such as HTML). The actual content of these items (i.e. the particular icon, particular lozenge, or particular label) can be dynamically defined by the content provider.

Furthermore, dynamic content items may have a defined format. As one specific example, dynamic content items may be defined to include one or more of: a static icon (defined in the integration descriptor), a label (which can be dynamically defined/updated by the content provider), and a status (which may be an icon or a lozenge and which can be dynamically updated by the content provider).

Figure 4:
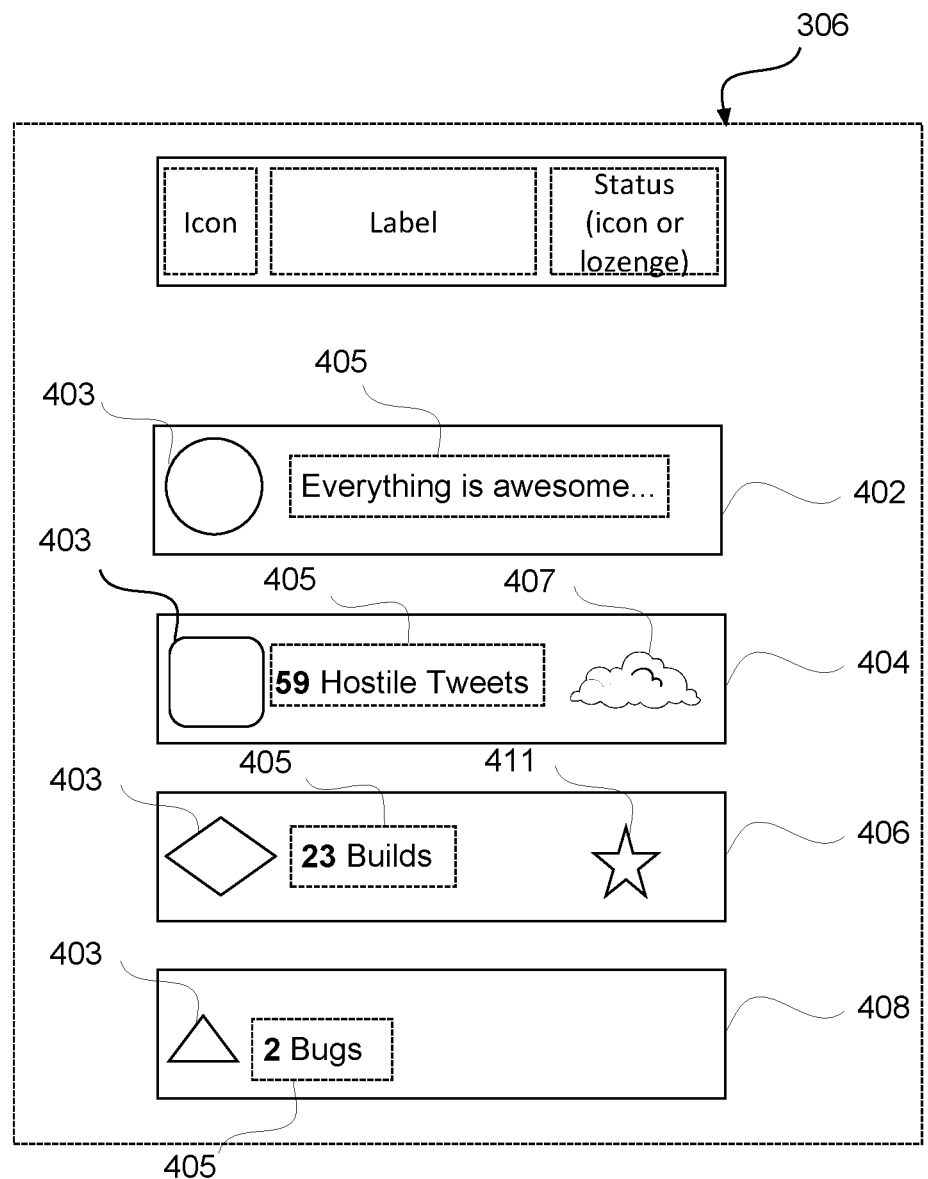
FIG. 4 illustrates exemplary dynamic content items displayed in the dynamic content item area of FIG. 3.

FIG. 4 illustrates some example dynamic content item formats. These example dynamic content items are displayed in the dynamic content item area 306. Dynamic content items 402, 404, 406 and 408 display dynamic summary information that changes as the state of underlying information monitored/maintained by a content provider (e.g. the application that the integration integrates with) changes.

Dynamic content item 402 includes a static icon 403 and a label 405. In this example, static icon 403 shows a smiley face and the label 405 states "everything is awesome." The icon 403 is defined by the integration descriptor and label 405 is dynamically defined by the content provider 106 (and as such may be altered by the content provider as desired, for example when the underlying conditions change). For example, if the underlying service encounters some errors, the label 405 may change to state, "some things are in error", "errors found" or something similar.

Dynamic content item 404 includes a static icon 403, a label 405, and a status (in this case another icon 407). Static icon 403 displays the logo of the content provider or underlying application (in this example Twitter®). Label 405 is a html label providing textual information in respect of the underlying application. Label 405 includes two portions: a number portion displaying the number of an attribute ("59" in this example) and an attribute portion displaying the type of attribute ("Hostile Tweets" in this example). Icon 407 indicates a status, and in this case is a raincloud. If the number of hostile tweets changes in number, the number portion of the label is updated, whereas the attribute portion remains unchanged. The icon 407 may also be updated. For example, if the number of hostile tweets increases, the rain cloud may be replaced by a thundercloud, or an alternative graphic indicating severity. Alternatively, if the number of hostile tweets reduces, the raincloud may change into a white cloud or into a sun icon, for example. If the underlying twitter handle attracts more positive tweets than hostile tweets, the attribute portion of the label 405 may be updated to display "positive tweets" instead of "hostile tweets". It will be understood that the label may also be configured to display the number of hostile and positive tweets together without departing from the scope of the present disclosure.

Dynamic content item 406 includes a static icon 403, a label 405 (indicating a total number of builds), and a lozenge 411. Lozenge 411 highlights the status of the underlying service for quick recognition. Specific colors may denote meanings that users can learn and recognize to become more efficient. For example, a green colored lozenge may indicate a positive status whereas a red colored lozenge may be used to indicate a negative status. In some aspects lozenges can reveal additional information on click or on hover. In dynamic content item 406, lozenge 411 has the text "all good" indicating that the applications are progressing well. Lozenge 411 could, for example, be displayed in green to reflect the positive status.

Dynamic content item 408 includes a static icon 403, and a label 405. The icon 407 reveals the logo of the underlying service. The label 405 includes two portions: a number portion and an attribute portion. The attribute portion depicts the attribute that is being monitored ("bugs" in this case) and the number portion depicts the number of bugs found in the underlying service ("2" in this case).

It will be appreciated that FIG. 4 is provided to highlight that a content provider may utilize various combinations of defined elements (in this case icons, labels or lozenges) to create a dynamic content item. The collaboration platform 102 may, however, offer any other formats or elements/components for dynamic content items, such as buttons, charts, badges, avatars, or the like to build aggregate information for display as dynamic content items.

In addition to the information that is displayed in a chat interface, a dynamic content item may have associated conditions which limit when a dynamic content item is rendered and/or who a dynamic content item is rendered for. For example, content providers 106 may add conditions to a dynamic content item so that the dynamic content item is only displayed to users of one or more particular types (a guest user, an admin user, a room owner user). By way of further example, content providers may add conditions to a dynamic content item so that the dynamic content item is only displayed when particular room conditions are satisfied—e.g. only when a room is a private group. Still further, a dynamic content item may include conditions that specify that a dynamic content item is rendered when a value of a particular attribute of the dynamic content item meets a certain condition (e.g. the attribute value is greater than, less than, or equal to a specified value). For example, a stock market dynamic content item may include a dynamic attribute used to display the stock price. The content item may be associated with a condition that prevents the dynamic content item from being rendered when the stock price is below a threshold value. Similarly, a weather service dynamic content item may include a condition that prevents the dynamic content item from being displayed unless the temperature exceeds a threshold value or a weather warning is issued. Any other conditions may be specified in the dynamic content item without departing from the scope of the present disclosure.

Once a content provider has initially created a dynamic content item, the content provider may communicate this information to the collaboration platform 102 in an integration descriptor, via the API server 112. The information can include, for example:
  a. a name of the dynamic content item,
  b. a description of the dynamic content item,
  c. a URL endpoint of the dynamic content item,
  d. any static data supported by the dynamic content item, such as a static icon, and
  e. any conditions associated with the dynamic content item (if applicable).

The URL endpoint is provided so that the client can query this endpoint to retrieve dynamic data of the dynamic content item. The integration descriptor may also include information about any related content associated with the dynamic content item, for example a webpage on which the related content is provided.

In certain implementations the collaboration platform 102 may facilitate updating/changing integration descriptors once they have been provided. This may, for example, be via an API server and associated API functions which content providers 106 can access. Via the API server (and appropriate API calls), a content provider 106 can add UI extensions to an integration, remove UI extensions from an integration, and/or update UI extensions defined in an integration. Where a data structure of UI extensions is maintained (e.g. as per the UI extension data structure example provide in Table C above), the API server can operate to record any UI extension changes directly in the data structure.

In other embodiments, if a content provider wishes to update an integration this can be done by uploading an updated integration descriptor to the collaboration platform 102.

In some embodiments, the integration descriptor may also include information about the integration that provides the dynamic content item. In that case, the descriptor includes the name, description, and web address of the integration and the capabilities of the integration. Capabilities define the functions the integration can perform, such as respond to queries, post notifications, display dynamic content items, and so on. The web address is provided so that the client 104 can access the integration when required.

Figure 5:
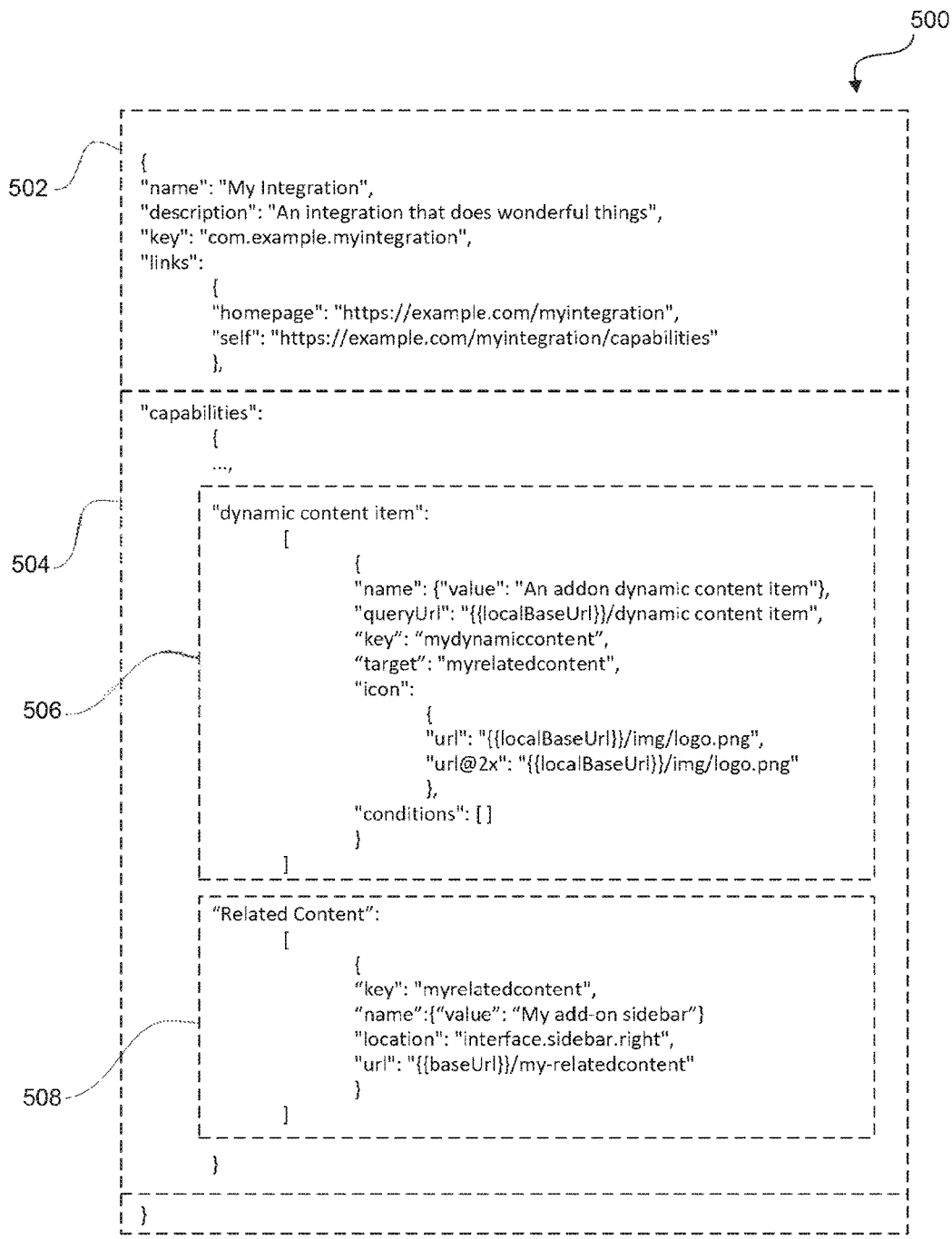
FIG. 5 is an example integration descriptor of an integration which provides a dynamic content item according to aspects of the present disclosure.

One specific example of an integration descriptor for an integration that offers a dynamic content item UI extension (and related content) is depicted in FIG. 5. In this example the integration descriptor 500 is divided into two portions 502 and 504. Portion 502 provides general information in respect of the integration, including a name, a unique key, a description, a homepage URL (which points to a page where information with respect to the integration can be obtained) and a "self" URL (a link that points back to the descriptor 500 itself, allowing the original integration descriptor to be obtained).

Portion 504 of the integrations descriptor 500 defines the capabilities of the integration. The integration shown in FIG. 5 supports a dynamic content item and related content for the dynamic content item. Accordingly, the capabilities section 504 includes a dynamic content item UI extension descriptor 506 and a related content UI extension descriptor 508. Not all dynamic content items will have associated related content.

In this particular example, the dynamic content item UI extension descriptor 506 includes: name information, defining data that can be rendered by a client 104 if the dynamic content item is only to include static data (i.e. if no query URL information is provided) or if the dynamic data cannot be retrieved from the query URL for some reason); query URL information, defining an endpoint, such as a REST endpoint, exposed by the integration for dynamic content; a key, defining a stable technical identifier that can be used internally to identify the element; target information, defining a key for any related content (described further below); icon information, defining URL's of a static icon (if any) to be displayed (in this example two different icon URL's are specified, one for low resolution and one (indicated by the 2x) for high resolution displays); and condition information, defining any conditions associated with the dynamic content item (discussed further below).

The related content UI extension descriptor 508 in this example includes: a key, defining a stable identifier for the related content (which can be used by a dynamic content item descriptor as described above); a name; a location, defining where the related content is to be displayed in the event a user interacts with the dynamic content item (in this case a right sidebar of the chat interface); and a URL, defining where the related content is to be retrieved from.

Integrations may be made available to users in various ways. For example, an integration marketplace may be maintained (either by the collaboration platform 102 or a separate system) which users can browse/search for and select integrations for installation. On selection of a particular integration for installation (either in a particular room or globally), the collaboration server 102 can retrieve the integration descriptor for that integration from the relevant content provider, process the integration descriptor to retrieve UI extension descriptors, and store these (e.g. in database 115), and communicate the UI extension descriptors to the relevant clients 104.

2.2.1 Installing Integrations and Displaying Dynamic Content Items

Figure 6:
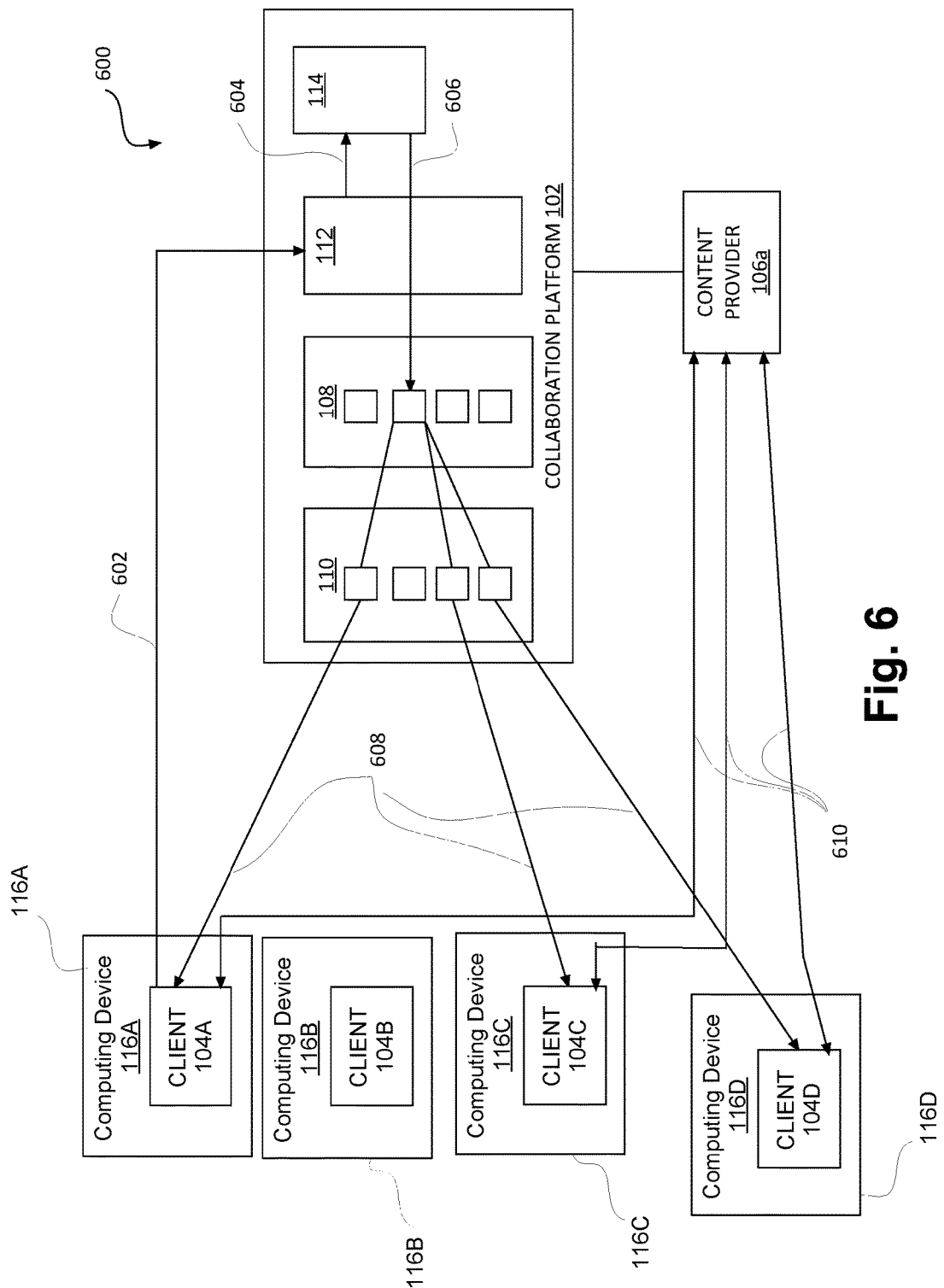
FIG. 6 is a message passing diagram illustrating an exemplary process for displaying dynamic content items in a chat interface.

FIG. 6 illustrates a high level process 600 for installing an integration at a client 104 and displaying a dynamic content item in a chat room.

The process begins when a user selects an integration for installation (either globally or in a particular chat room). This results in the user's client 104 sending a request to the collaboration platform 102 (and, in particular, the API server 112) (indicated by arrow 602).

The API server 112 forwards the request to the integration server 114 (indicated by arrow 604).

The integration server 114 retrieves the integration descriptor 500 of the requested integration. The integration descriptor 500 may include several UI extension descriptors, each defining a UI extension. In the present embodiment, the integration server 114 processes the integration descriptor 500 in order to extract individual UI extension descriptors and store these descriptors separately (e.g. in a UI extension data structure as described above). The integration server 114 may also store the entire integration descriptor 500 (e.g. in an integration data structure as described above).

The integration server 114 also generates integration installation information including information regarding the integration (e.g. the UI extension descriptors in respect of the integration), determines the relevant client recipients and forwards the integration installation information, along with the identity of the relevant client recipients, to the communication server 108 (indicated by arrow 606).

The communication server 108 then forwards the integration installation information to the active clients 104 in the recipient list (indicated by arrows 608). Communication to the active clients is, in this example, via the proxy server 110. A client 104 receives and stores the integration installation information, retrieves any dynamic content of dynamic content item(s) from the content providers (indicated by arrows 610), and renders the associated dynamic content item(s) in its chat interface 300.

This process will be described in detail in the following sections.

In the process described above the integration server processes the integration descriptor to extract and store individual UI extension descriptors. These individual UI extension descriptors are then sent to clients and (as described further below) used to calculate integration tokens. In alternative embodiments, the integration server 114 may instead store the integration descriptor 500 itself, as a whole (i.e. without extracting individual UI extension descriptors), send the integration descriptor 500 to clients, and use the integration descriptor 500 to calculate integration tokens.

2.2.1.1 Collaboration Platform Operation

Figure 7:
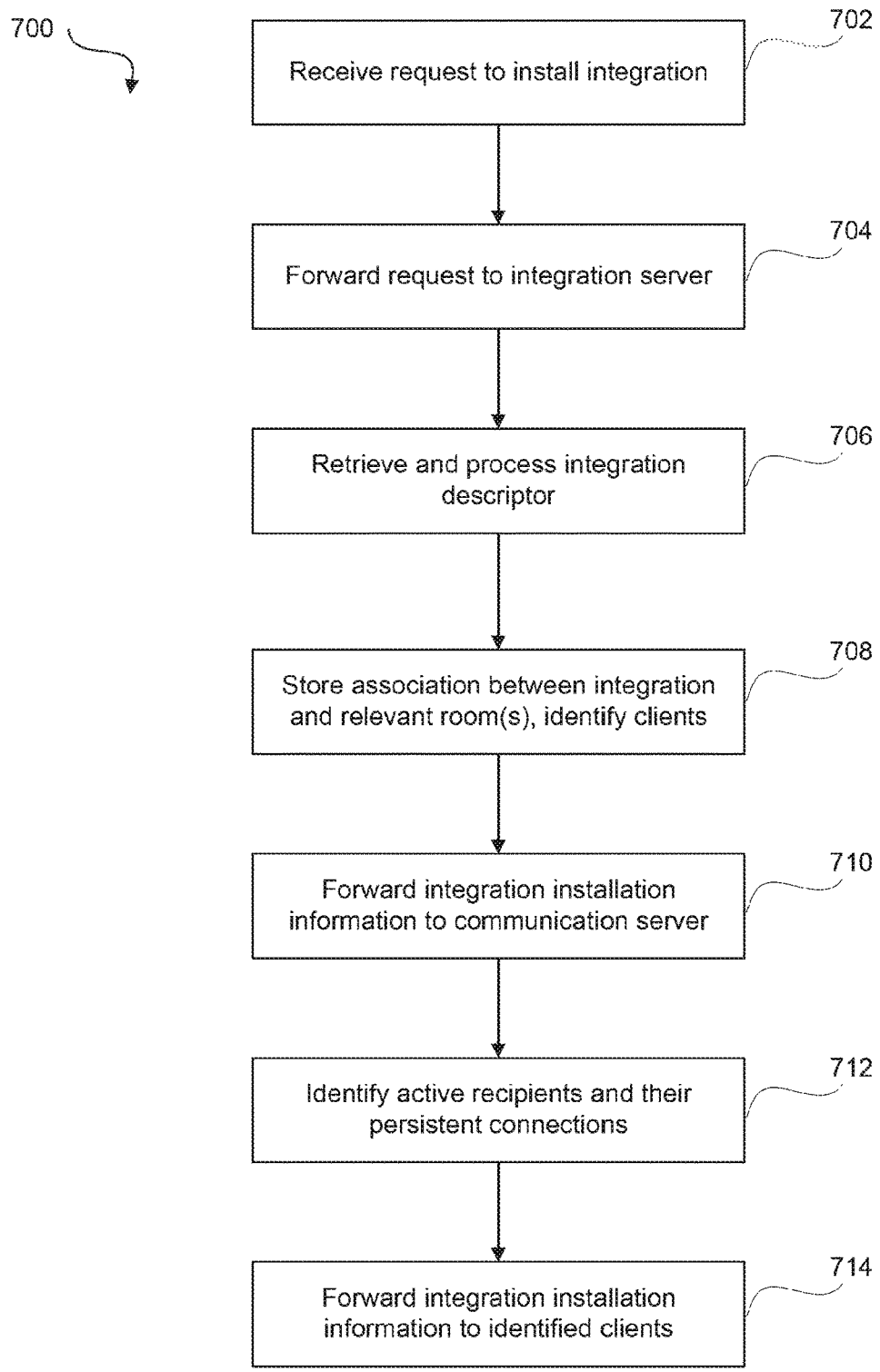
FIG. 7 is a flowchart illustrating an exemplary method for forwarding an integration descriptor defining a dynamic content item from a collaboration platform to a client.

FIG. 7 is a flow chart illustrating an exemplary method 700 performed by the collaboration platform 102 to forward an integration descriptor including information about one or more dynamic content items to one or more clients 104.

At 702, the collaboration platform 102 (and in particular the API server 112) receives a request from a client 104 (e.g. client 104*a*) to install an integration which defines one or more UI extensions (e.g. an integration that provides a dynamic content item). The request includes an identifier for identifying the requested integration, e.g. a name, key, or any other unique identifier utilized by the integration server 114 to identify the requested integration. In the example shown in FIG. 5, the identifier of the integration is key "com.example.myintegration". The client request further includes information about the user (e.g. a user identifier) and information on where the integration is to be installed—e.g. in a particular room or rooms, or globally (i.e. across all rooms in the collaboration system instance).

At 704 the API server 112 forwards the request to the integration server 114.

At 706, the integration server 114 uses the integration identifier from the request to retrieve the integration descriptor for the identified integration. Once received, the integration server 114 processes the integration descriptor in order to extract and store the UI extension descriptor(s) defined therein. Where integration and room tokens are used for client synchronization purposes (as described in further detail below), the integration server 114 also calculates an integration token for the integration (and stores this, for example in an integration token data structure as described above) and a room token for the room in which the integration is to be installed (and stores this, for example in a room token data structure as described above).

At 708, the integration server 114 generates and stores an association between the integration identified in the request and the room(s) identified in the request. For example, and using the example data structures described above, this may be achieved by updating the room/integration data structure to create a record associating the room identifier with the integration identifier. The integration server 114 also and uses the room identifier to identify the users that are members of the identified room (e.g. from the integration data structure and room/user data structure).

At 710, the Integration server 114 generates and forwards integration installation information and identifiers for the users who are to receive the new integration to the communication server 108. In the present embodiment, the integration installation information includes the UI extension descriptors for the UI extensions defined by the integration. Where tokens are used to facilitate client synchronization (as described further below), the integration installation information also includes at least an integration token in respect of the integration (and, depending on implementation, may also include a new room token in respect of the room in which the installation has been installed).

At 712, the communication server 108 determines which clients are connected to the collaboration platform 102 from the connection table and identifies the persistent connections between those active clients and the proxy server 110.

At 712, the communication server 108 forwards the integration installation information to each active room member identified through the persistent connections. The integration installation information may be forwarded to non-active clients when they connect to the collaboration platform 102, as described in detail with reference to FIGS. 19-21.

2.2.1.2 Client Operation

Figure 8:
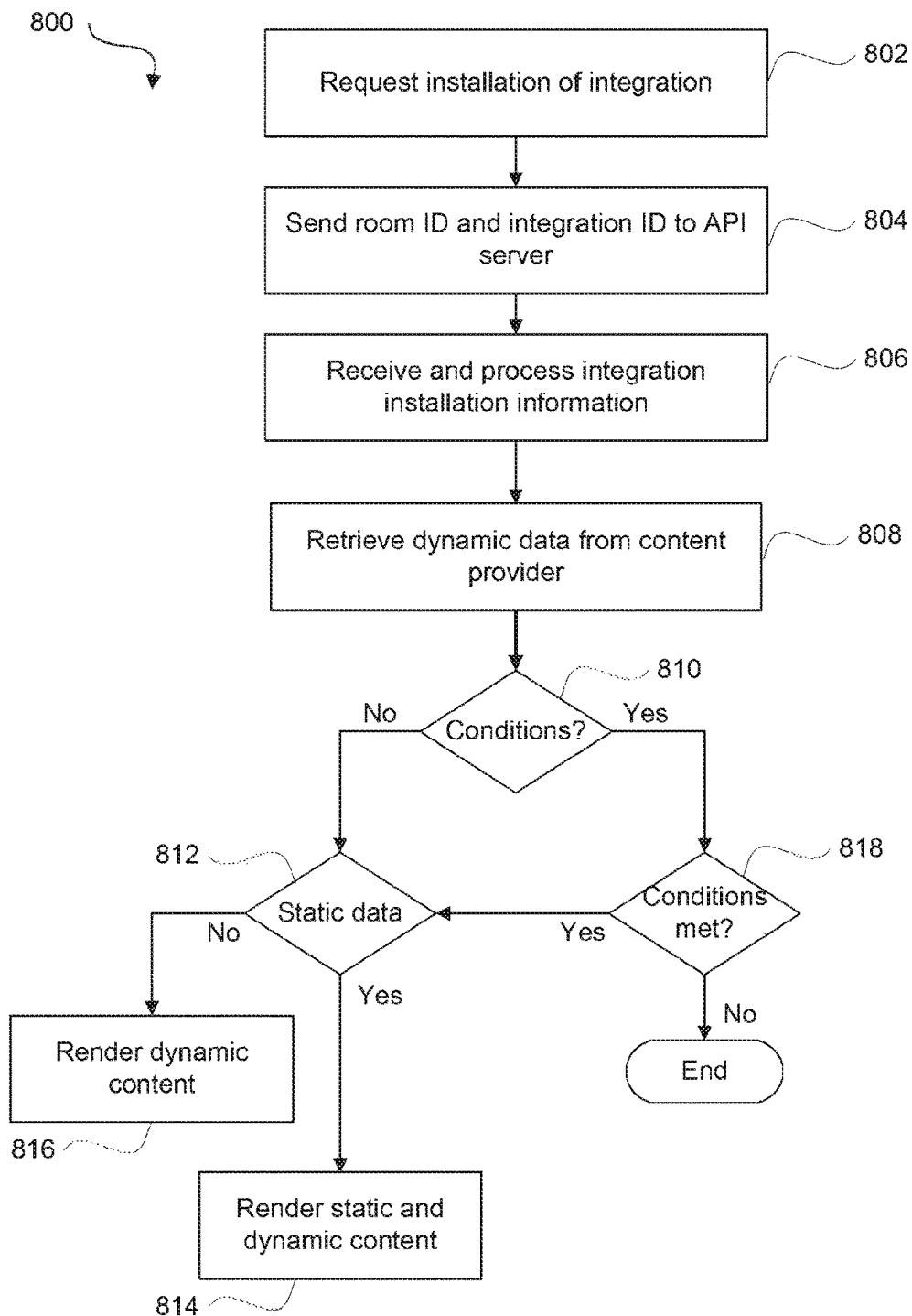
FIG. 8 is a flowchart illustrating an exemplary method performed by a client for displaying dynamic content items in a chat interface.

FIG. 8 illustrates an exemplary method 800 performed by a client 104 to install an integration having one or more UI extensions (e.g. an integration that defines a dynamic content item) in a particular chat room. Steps 802 and 804 are performed by a client 104 that selects an integration to be installed. Steps 806 to 822 are performed by all clients who are members of a chat room to which the integration is added.

At step 802, a client 104 requests installation of an integration that defines one or more UI extensions. As mentioned previously, the user 118 may access a list of integrations and select one or more integrations from the list to install globally or in a particular chat room. An integration may be selected by clicking on an "add" button, for example.

At 804, the client 104 sends a room identifier of the chat room in which the user 204 wishes to add the integration. The identifier(s) are forwarded along with the identifier of the selected integration to the API server 112.

At 806, a client 104 receives and processes integration installation information from the collaboration system 102. A client 104 receives the integration installation information if it is a member of a room to which an integration has been added (this may, though need not necessarily, include the client 104 that actually sent the integration request).

As described above, the integration installation information includes at least UI extension descriptors for the UI extension(s) provided by the integration. Where tokens are used to facilitate client synchronization (as described further below), the integration installation information also includes at least an integration token in respect of the integration (and, depending on implementation, may also include a new room token in respect of the room in which the installation has been installed). The client 104 retrieves information from the integration installation information and stores it in the memory of the computing device 116 on which the client 104 is running.

In some embodiments the client 104 is configured to store all integrations and their dynamic content items in a single data structure, such as an integration data table. On receiving an integration descriptor the client 104 checks to see if the integration already exists in the integration table (e.g., for another chat room). This can be done, for example, by checking if an integration token received in the integration installation information matches any integration token already stored at the client 104. If no match is identified, the integration is not already present. In this case the client 104 extracts the UI extension descriptor(s) from the integration installation information and stores this/these locally. Alternatively, if a token match is identified the client 104 already has the integration and does not need to re-store information from the integration installation information. This way, the client avoids duplication of integrations that are installed in multiple rooms.

By way of example, Tables I, J and K below illustrate example data structures in which a client 104 can locally store information in respect of installed integrations. Alternative data structures could be used. Table I provides an example of a data structure for maintaining an association between rooms that the client 104 is a member of and integrations installed in those rooms:

TABLE I

Example room/integration data structure (client)

| Room identifier | Integration key |
|---|---|
| 123 | Integration 1 |
| 974 | Integration 1 |
| 974 | Integration 6 |
| [None] (indicating global room) | Integration 3 |
| ... | ... |

Table J provides an example of a data structure for maintaining an association between integrations installed by the client 104 and the UI extension descriptors associated with those integrations:

TABLE J

Example UI extension data structure (client)

| Integration Key | UI Extension Type | UI Extension Descriptor |
|---|---|---|
| Integration 1 | Dynamic content item | <UI extension descriptor> |
| Integration 1 | Conditional control | <UI extension descriptor> |
| Integration 2 | Dynamic content item | <UI extension descriptor> |
| ... | ... | ... |

Table K provides an example of a data structure for maintaining an association between integrations and integration tokens (as received in the integration installation information when tokens are used):

TABLE K

Example integration token data structure (client)

| Integration identifier | Integration token |
|---|---|
| Integration 1 | f3846du3 ... |
| Integration 2 | h2983gu3 ... |
| Integration 3 | g2631by8 ... |
| ... | ... |

In embodiments where room tokens are used and communicated to clients, these may also be stored locally by a given client 104 in a data structure that maintains associations between rooms and room tokens. Table L below provides one example of such a data structure:

TABLE L

Example room token data structure (client)

| Room identifier | Room token |
|---|---|
| 123 | a38462ghy ... |
| 974 | b38462bcd ... |
| [None] (indicating global room) | b87382cde ... |
| ... | ... |

At completion of 806 the integration is installed at the client 104.

At 808, the client retrieves dynamic data of the dynamic content item from the content provider 106. The dynamic content is not provided by the collaboration platform 102, or by other members of the chat room. Rather, the dynamic content is retrieved directly from the content provider 106 (as defined in the dynamic content item UI extension descriptor) the first time an integration is installed and every time after that when the client 104 reconnects with the collaboration platform 102. At other times, the content provider 106 may push dynamic data to active clients 104 (as described in detail in the next section).

To obtain dynamic data, the client 104 retrieves the address of the dynamic data from the descriptor (e.g. the queryURL in descriptor 500). The client 104 then sends a request to the URL to obtain the dynamic data. The request may include identifiers that indicate the room and user requesting the information. In some embodiments, the client retrieves the URL of the integration and the REST endpoint of the dynamic content items from the descriptor and communicates directly with the content provider 106 using a JSON Web Token (JWT). The JWT may include the room ID, and the user ID of the client 104. This information is used by the content provider to return the dynamic data to the right client 104. In one example, the request may be in the following form:

GET/Dynamic content item/repos?signed_request=ey . . . HTTP/1.1
   Origin: https://subdomain.hipchat.com
   Host: addon.example.com
   In this example, the JWT token is passed in the "signed_request" query parameter.

In response to the data request, the content provider 106 returns a dynamic data update in respect of the dynamic content item. This may include, for example, any dynamic content any metadata applicable to the dynamic content item. In certain embodiments, and by way of example only, the dynamic data is received from the content provider 106 in a JSON document as shown in Table M below:

TABLE M

Example dynamic data update

```
Access-Control-Allow-Origin: *
Date: Mon, 17 Aug 2015 07:15:10 GMT
Content-Type: application/json
{
  "label":
  {
     "type": "html",
     "value": "<b>4</b> Repositories"
  },
  "status":
  {
     "type": "lozenge",
     "value":
     {
       "label": "LOCKED",
       "type": "yellow"
     }
  },
  "metadata":
  {
     "customData": {"customAttr": "customValue"}
  }
}
```

In this example, the content provider specifies that a label and a status (in the form of a lozenge) are to be displayed. The label is a html label which has a value of "4 Repositories". The "status" node defines the attributes of the dynamic status, such as: type of status indicator (i.e., whether it is an icon or a lozenge) and the value of the indicator (i.e., what type of icon or lozenge it is). In case the status indicator is a lozenge, the value field includes the label and type of the lozenge that indicate what the text and color of the lozenge is, respectively. In case the status indicator is an icon, the value field includes a text to be displayed on the lozenge or a web address from where the icon can be retrieved. In the example JSON document above, the status indicator is a lozenge that displayed the text "Locked" in a yellow colored lozenge.

The metadata node includes the data which the conditions defined for the dynamic content item (in the descriptor) operate on. By way of example, a descriptor 500 may define a condition for a dynamic content item as shown in Table N below:

TABLE N

Example dynamic content item condition

```
{
   "condition": "glance_matches",
   "params":
   {
      "metadata":
```

TABLE N-continued

Example dynamic content item condition

```
      [
         {"attr": "isConfigured", "eq": true}
      ]
   }
}
```

The metadata node in the response communicated by the content provider 106 may then take a form such as that shown in Table O below:

TABLE O

Example metadata node

```
"metadata":
{
   "isConfigured": true
}
```

In this case, the dynamic content item would be displayed in the user interface. Conversely, if there was no metadata, or if "isConfigured": false, then the dynamic content item would not be displayed.

At 810, the client 104 determines whether the dynamic content item has any conditions. In the present embodiment, this determination is made by reviewing the JSON document received from the content provider at step 806.

If, at 810, the client 104 determines that the dynamic content item does not have any conditions, the method proceeds to 812. At 812, the client 104 determines whether the dynamic content item has any static data. In one embodiment, this is determined by parsing the descriptor 500 to identify any static data, such as a static icon. If static content is present, the client 104 renders the dynamic content item in the dynamic content item area 306 of the chat interface 300 with the static data and dynamic data, at 814. Alternatively, the client renders the dynamic content item with only the dynamic data, at 816. Any known technique may be utilized to render the dynamic content item without departing from the scope of the present disclosure.

If, at 810, the client 104 determines that the dynamic content item includes conditions, the method proceeds to 818. At 818, the client evaluates if the conditions associated with the dynamic content item are met. For example, if the condition is that the dynamic content item can only be viewed in a public room, the client may evaluate if the room identifier is for a private or public room. Similarly, if a dynamic content item condition defines that the dynamic content item can only be viewed by a particular type of user, such as an admin user, the client 104 determines whether the user is an admin user. Other conditions may include comparing attribute values with threshold values. It will be appreciated that any other conditions may be configured without departing from the scope of the present disclosure.

If, at 818, all conditions are met, the method proceeds to 812 to display the dynamic data and (if required) any static data as described above. Alternatively, if at 818 the conditions are not met, the method 800 finishes without rendering any dynamic content items.

In some embodiments, dynamic content items are rendered as or with interactive items. In this case a user can interact with a dynamic content item (e.g. by clicking on or otherwise activating the dynamic content item or an element within the dynamic content item) in or order to display related content. Where a user 204 interacts with a dynamic content item, the client 104 retrieves the related content associated with the dynamic content item and renders the related content in the chat interface 300. In certain embodiments, on interaction with a dynamic content item the client 104 retrieves an address for the related content from portion 508 of the descriptor 500 and sends a request to that address. The request may include a JWT including contextual information about the request: authorization ID, room ID, user ID, etc. In return, the content provider provides the requested content, which is displayed in the location specified in the descriptor 500 (such as within a side panel of the chat interface, in a popup widow, or in an external page) or in any other predetermined location.

2.2.1.3 Content Provider Operation

Figure 9:
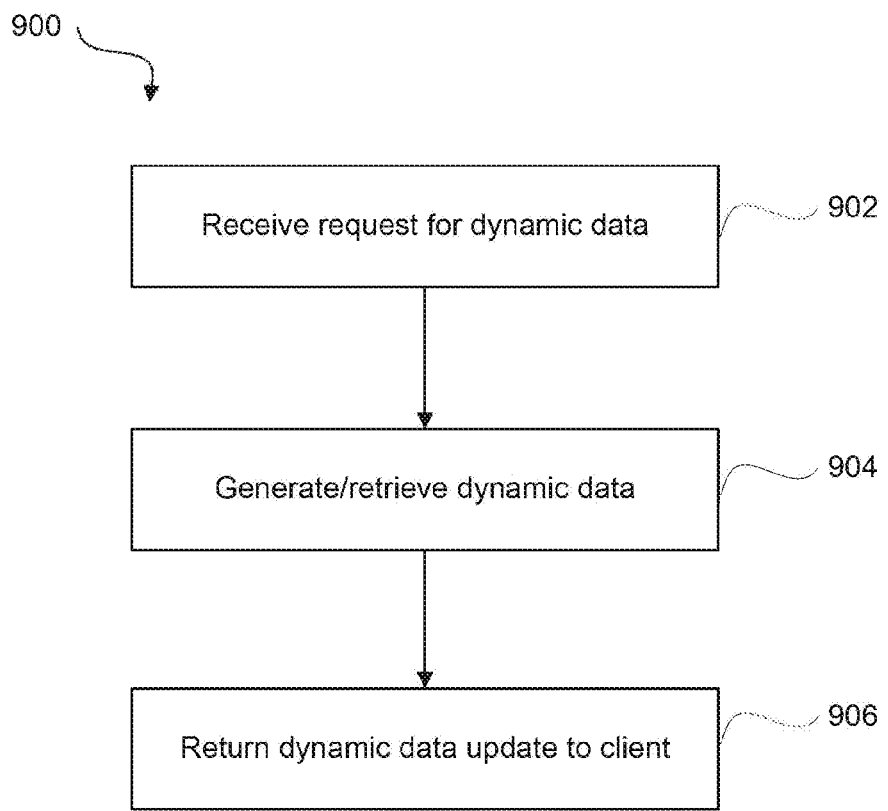
FIG. 9 is a flowchart illustrating an exemplary method performed by a content provider for forwarding dynamic data of a dynamic content item to a client.

FIG. 9 illustrates the method steps performed by the content provider 106 to forward dynamic data of a dynamic content item to a client 104.

At 902, the content provider 106 receives a data request from a client 104 for dynamic data in respect of a dynamic content item. The data request may be received at an exposed REST endpoint. As described previously, with respect to FIG. 8, the request may include a user identifier, and/or a room identifier.

At 904, the content provider 106 generates or retrieves the requested dynamic data. Various different methods may be utilized for generating/retrieving the dynamic content of the dynamic content item.

For example, if the dynamic content item is provided to display a number of bugs in a software product, the content provider 106 may review the underlying issue tracking system to determine the number of bugs that have been reported for the software. The determined number of bugs may subsequently be compared with one or more threshold values. If the number of bugs is below a certain threshold, the content provider 106 may generate the label 409 that states "everything is awesome", if the number of bugs exceeds the threshold but is under a second threshold, the content provider 106 may generate a label 409 that states "some things are not in order", and if the number of bugs exceeds the second threshold as well, the content provider may generate the label "we are doomed".

As a further example, if the dynamic content item is provided to display social media information, the content provider 106 may review the tweets posted for the chat room's Twitter® handle or against a hashtag associated with the chat room and determine whether the tweets are favorable or hostile. Then, depending on how the integration was programmed, the content provider 106 may generate a label with the number of hostile and/or favorable tweets and (by comparing the number of hostile tweets with one or more thresholds), determine which icon should be used: rain clouds, thunderclouds, white clouds or the sun.

Once the content provider 106 generates/retrieves the values for the dynamic labels, icons or lozenges, the content provider 106 returns a response (e.g. a HTTP response) including the dynamic data to the clients 104 at step 906. In one aspect, the response takes the form of/includes a JSON document as described above.

2.2.2 High Level Process—Updating Dynamic Content

The dynamic data of a dynamic content item corresponds to events taking place in the underlying service. As relevant changes occur in the underlying service (i.e., changes which the dynamic content item is configured to display information on), the dynamic data of the dynamic content item should also change. For instance, if a dynamic content item displays a tally of a particular attribute maintained/monitored by the underlying service, the tally displayed by the dynamic content item should increase or decrease each time a relevant event occurs in the underlying service.

To account for this, the collaboration platform 102 provides a mechanism which allows content providers 106 to push dynamic data to clients 104 to be rendered in dynamic content items. This is in contrast to the clients 104 requesting dynamic data from content providers 106 as described above with respect to FIGS. 6-8, which occurs when a client 104 connects with the collaboration platform or when a new integration is installed in the client 104.

Figure 10:
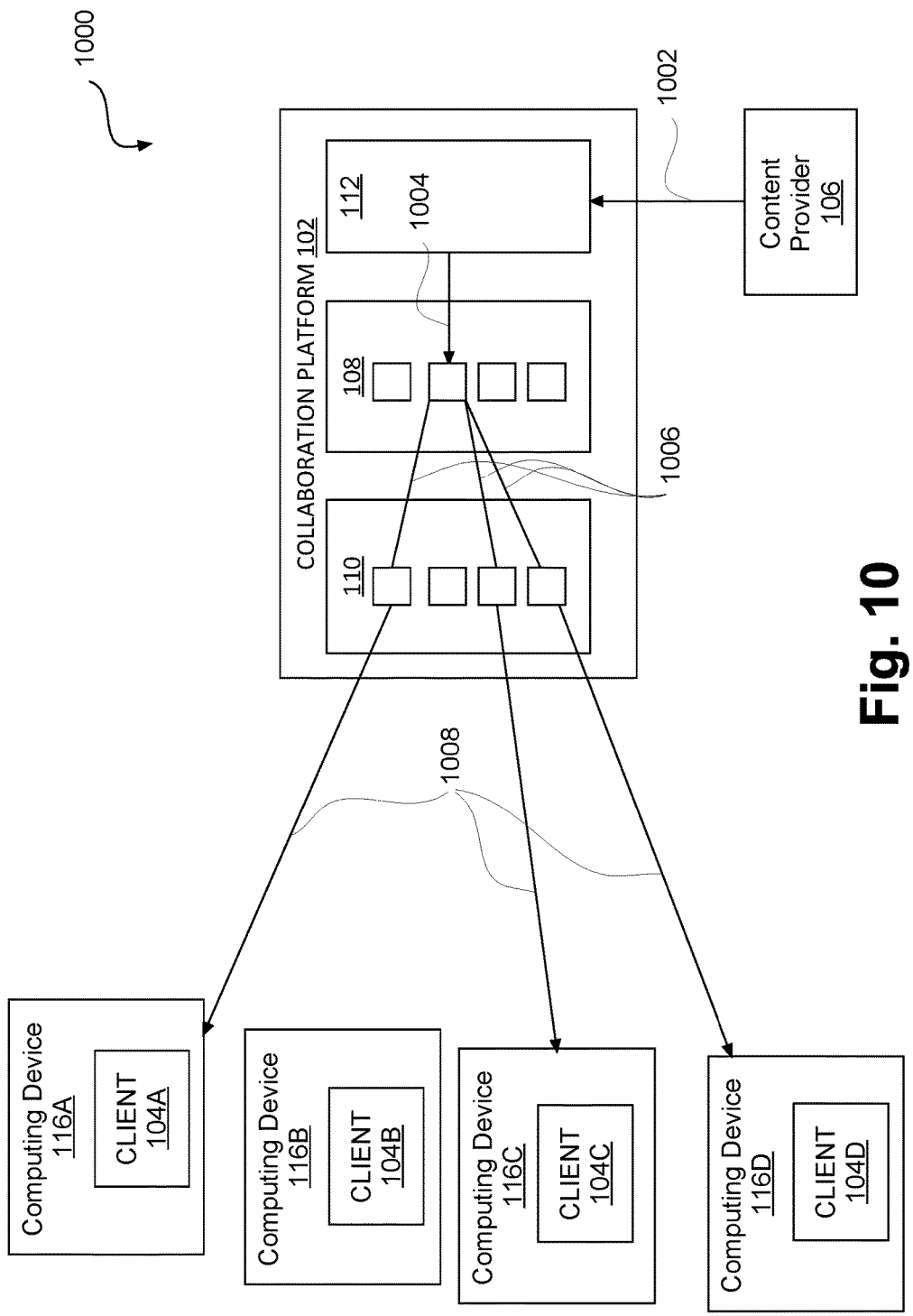
FIG. 10 is a message passing diagram illustrating an exemplary method for updating dynamic data of a dynamic content item according to aspects of the present disclosure.

FIG. 10 is a message passing diagram which provides an overview of an exemplary process 1000 by which the content provider 106 can push content to one or more clients.

Process 1000 commences with a content provider 106 generating and forwarding an update to the API server 112 (indicated by arrow 1002). The update includes updated data for at least one dynamic content item defined by an integration. The update also includes the recipients of the update. The recipients of the update may be identified in various ways, for example by specifying an entire organization, one or more particular chat rooms, and/or one or more particular users in a particular chat room.

The API server 112 then forwards the dynamic data and recipient list to the communication server 108 (indicated by arrow 1004). The communication server 108 distributes the updated dynamic content to the connected recipients (indicated by arrow 1006). And finally, the clients 104 receive the updated content (indicated by arrow 1008) and update the chat interface to reflect the updated dynamic content received from the collaboration platform 102.

The following sections describe this process in detail from the perspective of the content provider, collaboration platform, and the client.

2.2.2.1 Content Provider Operation

Figure 11:
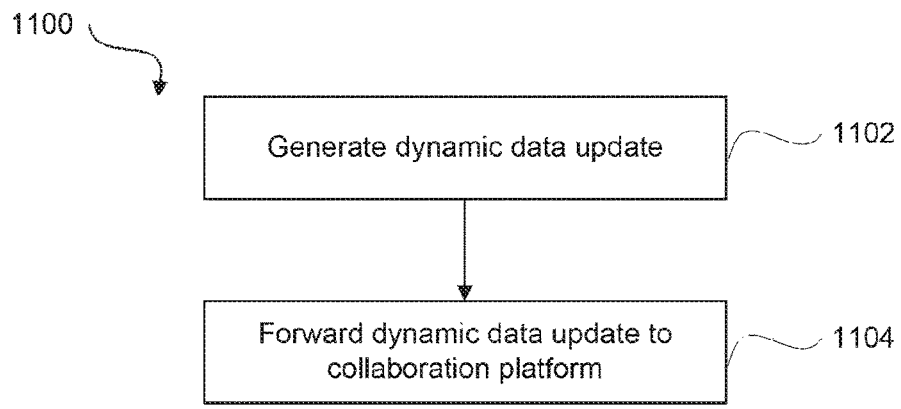
FIG. 11 is a flowchart illustrating an exemplary method performed by a content provider in forwarding updated dynamic data to a collaboration platform.

FIG. 11 illustrates an exemplary method 1100 for forwarding updated dynamic data from the content provider 106 to the collaboration platform 102.

At 1102, the content provider 106 generates a dynamic data update. In one example, the update may have the format described with respect to Table M above.

The manner in which the dynamic data updates are generated is dependent on update conditions associated with the dynamic content item to which the update relates. For instance, for certain dynamic content items, content providers 106 may set update conditions that define predetermined intervals at which updates are to be generated (e.g., every 5 minutes, or every hour, etc.). For other dynamic content items, content providers 106 may set conditions such that an update is generated every time the value of a monitored attribute crosses a predetermined threshold. For example, in the case of dynamic content item 402 (which provides information on the status of software builds), the content provider 106 may be configured to monitor the number of builds and statuses of those builds to generate an update when the number of builds changes or the status of the builds changes (e.g., from "all good" to "not so good"). As a further example, in the case of dynamic content item 404 (which provides information on the number of hostile tweets), the content provider 106 may monitor the tweets to determine their number and disposition, and generate an update when the number of tweets changes (to change the number of tweets reported in the dynamic content item) or when the number of hostile tweets exceeds a second threshold (in order to update the storm cloud icon to indicate a higher severity).

As described previously, in addition to the updated content which is to be displayed in the dynamic content item, the update also includes the recipient identifiers in respect of the intended recipients for the update. By way of example: if an update is intended for all members of an organization it may be sent to the API server 112 using a command such as 'POST/v2/integration/uf'; if an update is intended for all members of a particular chat room, it may be sent to the API server 112 using a command such as 'POST/v2/integration/ui/room/{room_id_or_name}'; if an update is intended for a particular user, it may be sent to the API server 112 using a command such as 'POST/v2/integration/ui/user/{user_id_or_email}'; if the update is intended for a particular user in a particular chat room, it may be sent to the API server 112 using a command such as 'POST/v2/integration/ui/room/{room_id_or_name}/user/{user_id_or_email}'.

At 1104, the content provider 106 forwards the update to the API server 112.

2.2.2.2 Collaboration Platform Operation

Figure 12:
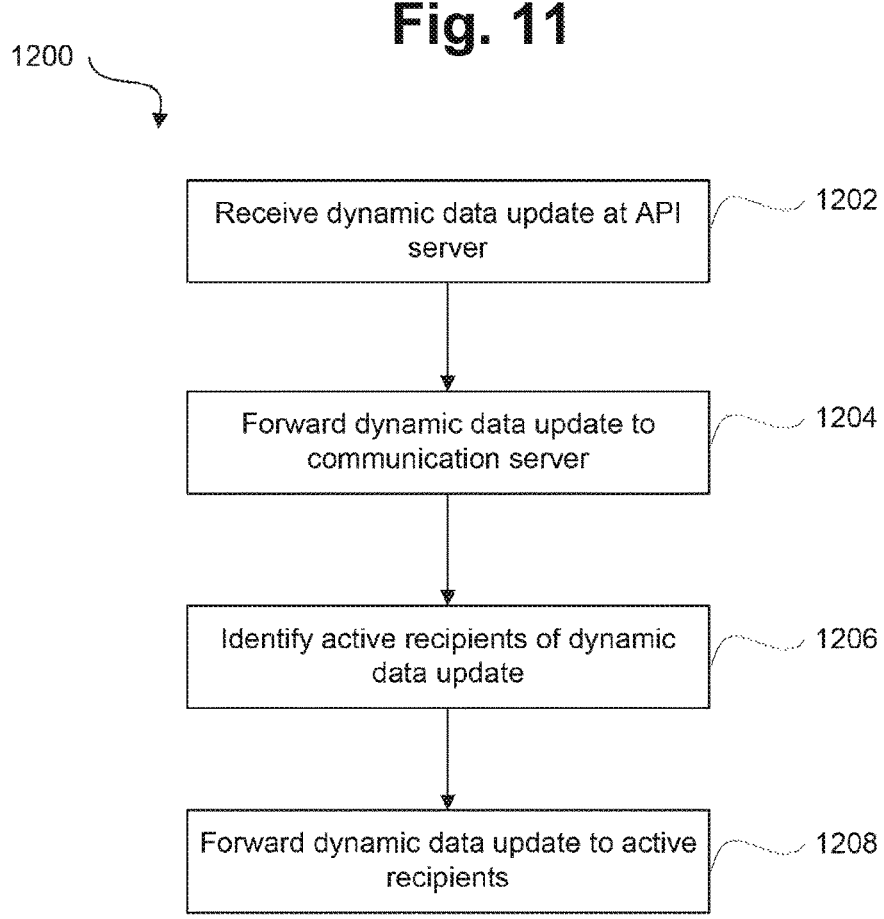
FIG. 12 is a flowchart illustrating an exemplary method performed by a collaboration platform for forwarding updated dynamic data from a content provider to a client.

FIG. 12 illustrates an exemplary method 1200 performed by the collaboration platform 102 to forward a dynamic data update received from a content provider 106 to the intended recipients of the update.

At 1202, the API server 112 receives a dynamic data update from the content provider 106.

At 1204, the API server 112 forwards the update to the communication server 108.

At 1206, the communication server 108 identifies the recipient client(s) 104 from the received update and determines whether the recipient clients are active or not. To that end, the communication server 108 performs a lookup in the connection table stored in the database 115. The persistent connection nodes of the active recipient clients are also retrieved from the connection table at this step.

At 1208, the communication server 108 forwards the dynamic data update to the persistent connections identified at step 1206, through which the dynamic content item update is forwarded to the clients 104 of the active recipients. The dynamic data updates are not forwarded to inactive clients. These clients are updated when they next establish a connection with the collaboration platform 102.

2.2.2.3 Client Operation

Figure 13:
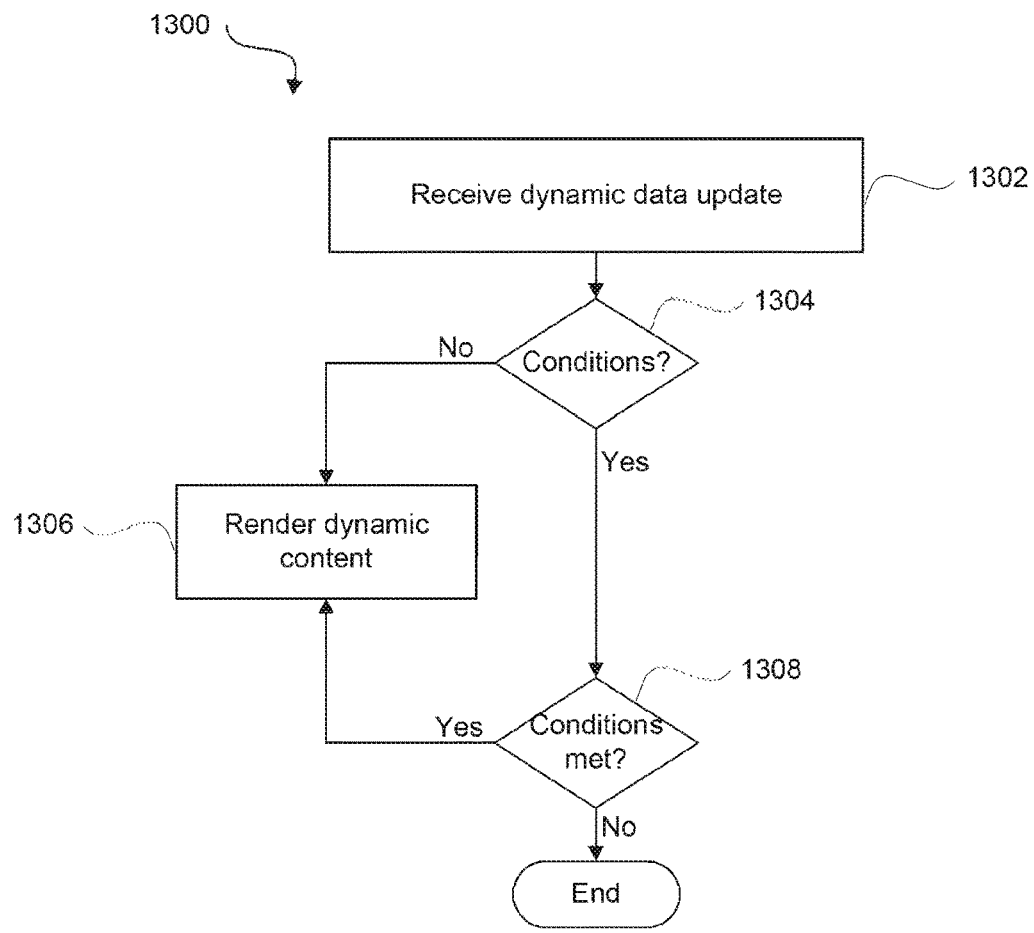
FIG. 13 is a flowchart illustrating an exemplary method performed by a client for rendering updated dynamic data in a dynamic content item.

As noted above, the dynamic data updates are periodically received by clients 104. FIG. 13 illustrates a method 1300 performed by a client 104 on receiving a dynamic data update.

At 1302, a client 104 receives a dynamic data update from the collaboration platform 102. The update may, for example, have the format described above.

At 1304, the client 104 determines whether the dynamic content item to which the received dynamic data update relates has any conditions.

If, at 1304, the dynamic content item does not have any conditions, the method proceeds to 1306. At 1306 the client 104 updates the relevant dynamic content item by rendering the updated data in the dynamic content item (in the dynamic content item area 306 of the chat interface 300).

If, at 1304, the dynamic content item being updated includes conditions, the method proceeds to 1308. At 1308, the client 104 evaluates the conditions of the dynamic content item (as described above).

If, at 1304, the conditions are met, the method proceeds to step 1306, where the dynamic content item is rendered with the updated dynamic content. If the conditions are not met, the method ends without updating the dynamic content item.

2.4 Clauses

Described herein is a computer implemented method for displaying a dynamic content item in a chat interface running on a client device, the method comprising: receiving, from a collaboration platform, a dynamic content item descriptor, the dynamic content item descriptor defining the dynamic content item and a content provider that is configured to provide dynamic data for the dynamic content item; receiving, from the content provider, dynamic data; and displaying the dynamic content item with the dynamic data in an area of the chat interface that is distinct from a messaging area of the chat interface.

The content provider may be defined by an address. The address may be a URL.

The method may further comprise sending, to the content provider, a content request comprising at least one of a user identifier, a chat room identifier, a client identifier, and a dynamic content item identifier, and the dynamic data may be received from the content provider in response to the content request.

The dynamic content item may comprise a static data element, the static data element being defined in the dynamic content item descriptor.

The static data element may be defined by an address from which the static data element is retrieved by the client device for display in the dynamic content item.

The dynamic data may comprise aggregate information about an underlying service.

The dynamic data may comprise data defining at least one dynamic data element for display in the dynamic content item, the at least one dynamic data element being selected from a group comprising: a label; an icon; and a lozenge.

The dynamic content item descriptor may define one or more conditions which are evaluated by the client device to determine whether or not to display the dynamic content item.

The response from the content provider may further comprise metadata, and the one or more conditions defined by the dynamic content item descriptor may be evaluated by the client device with reference to the metadata.

The computer implemented method may further comprise: receiving a dynamic data update, the dynamic data update being initiated and generated by the content provider and communicated to the client device via the collaboration platform; and updating the dynamic content item to display data from the dynamic data update.

The computer implemented method may further comprise: receiving, from the collaboration platform, a related content descriptor, the related content descriptor being associated with the dynamic content item and defining an address from which related content can be retrieved; detecting activation of a displayed dynamic content item; retrieving the related content from the address defined in the related content descriptor; and displaying the related content in the chat interface.

Also described herein is an electronic device configured to operate as a client to a collaboration platform, the computer processing system comprising: one or more processors; a display, a communications interface; and one or more non-transitory computer-readable storage media storing sequences of instructions which, when executed by the one or more processors, cause the one or more processors to perform a method as described in the preceding paragraphs of this section (section 2.4).

Also described herein is non-transient computer readable storage comprising instructions which, when executed by a processor, cause the processor to perform a method as described in the preceding paragraphs of this section (section 2.4).

3. Conditional Controls

As outlined above, aspects of the present invention enable UI extensions in the form of conditional controls to be defined for display by clients 104. Conditional controls are invoked from a chat interface to allow users to perform various actions. The controls are conditional in that they depend on one or more conditions/rules being fulfilled. The conditions can include contextual conditions, i.e., conditions based on the content of messages, notifications, dynamic content items, or related items, or characteristic conditions, i.e., conditions based on a characteristic of a message, notification, dynamic content item or related item. By way of example, if a message is determined to include a link, a conditional action may be generated to provide a user with options of opening the link in the client or opening the link in a browser. In another example, if a related item displays a negative review from a customer, a dynamic control may be generated which allows a user to discuss the review with peers.

3.1 Context

In various embodiments, the techniques herein address problems that the inventors have identified in the way users interact with content in traditional chat interfaces. Traditionally, chat interfaces allow users to view communications between parties and perform certain fixed actions. For example, a chat interface may allow a user to delete a message, reply to a message, or attach an item to a message. The tasks that can be performed with these actions are often limited.

3.2 Implementation

Aspects of the present disclosure provide a collaboration platform 102 that allows content providers 106 to add conditional controls in chat interfaces. The embodiments described herein permit a content provider to define conditional controls that can be added to messages sent by users or integrations, to dynamic content items, and/or to related content.

In the embodiments described herein, a conditional control is defined by a content provider 106 and is associated with one or more display conditions. Display conditions are evaluated by a client 104 to determine whether or not the conditional control should be displayed and made available to the user of the client 104.

Figure 14:
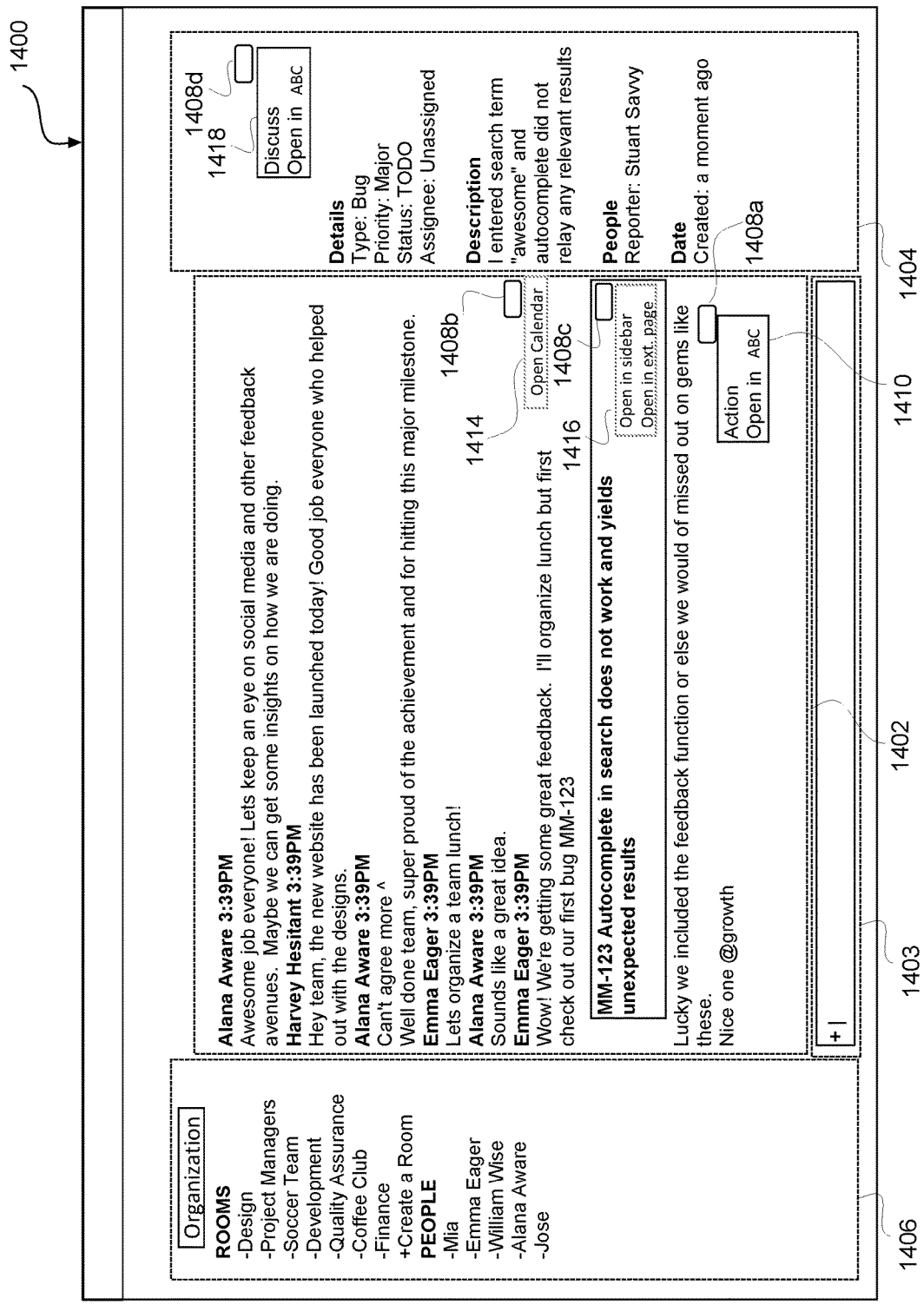
FIG. 14 is a screenshot of an exemplary chat interface illustrating conditional controls according to aspects of the present disclosure.

FIG. 14 illustrates an example chat interface 1400 which includes conditional controls. The chat interface 1400 includes a message area 1402 that shows messages from different users and integrations, an input area 1403 where a user can create a new message, a right side panel 1404 that (in this instance) shows related content for integration 'ABC', and a left side panel 1406 that depicts the various rooms a user is a member of and the members of the current chat room.

In interface 1400, conditional controls are provided in multiple locations. In order to view conditional controls, a user selects a view controls button 1408. In the context of the view controls button, "button" should be understood as being any UI element/control that a user can interact with. In FIG. 14, the view controls buttons 1408 are depicted as ellipses (" . . . "), however any other control may be used. When a user activates/selects the view controls button 408, relevant conditional controls 410 are displayed. The conditional controls may be displayed in a pop-up window, drop-down window, or any other such window.

Interface 1400 depicts two sets of conditional controls (1414 and 1416) which are associated with, and have display conditions based on, received messages. For a given message, display conditions can be based the content and/or context of the message, for example: the content of the message (e.g. whether a predefined regular expression is matched), the presence and/or type of any message attachments, the sender of the message (i.e., see conditional control 1418), or other content/context information.

By way of an example, a calendar integration may define a conditional "open calendar" control to be displayed whenever a message includes words such as "organize", a date, a day, "schedule", "calendar", "appointment", etc. In chat interface 1400, Emma Eager's message is "let's organize a team lunch!" As a word in this message matches a condition of the calendar conditional control, the conditional control 1414, "open calendar," is displayed when the user selects view controls button 408b. The user can then select the "open calendar" control to launch a calendar application which, for example, provides an indication of the availability of the people in the chat room.

By way of another example, an integration may create a conditional controls "open in sidebar" and/or "open in external page" that are displayed when a message includes a link. In chat interface 1400, Alana Aware's message includes a link. Accordingly, the conditional controls 1416, "open in sidebar" and "open in external page" are displayed when the user selects view controls buttons 1408c.

Conditional controls may also be associated with dynamic content items or related content. For example, a social media integration may create conditional controls such as "discuss with peers" or "open in application" if a dynamic content item, message notification, or related content reveals hostile tweets. Similarly, integration ABC may create conditional controls such as "discuss" and "open in ABC" when the status of a dynamic content item or related content is "to do", "we are doomed", "some things are in error", "errors found", "bugs found", etc. In chat interface 1400, the related content is populated by integration ABC. Because the status of the related content is "to do", conditional actions "discuss" and "open in ABC" are displayed when the user selects the view controls button 408d.

As described above, aspects of the present disclosure allow content providers 106 to create integrations and declare these integrations to the collaboration platform 102. In certain embodiments, conditional controls are defined in an integration descriptor.

Figure 15:
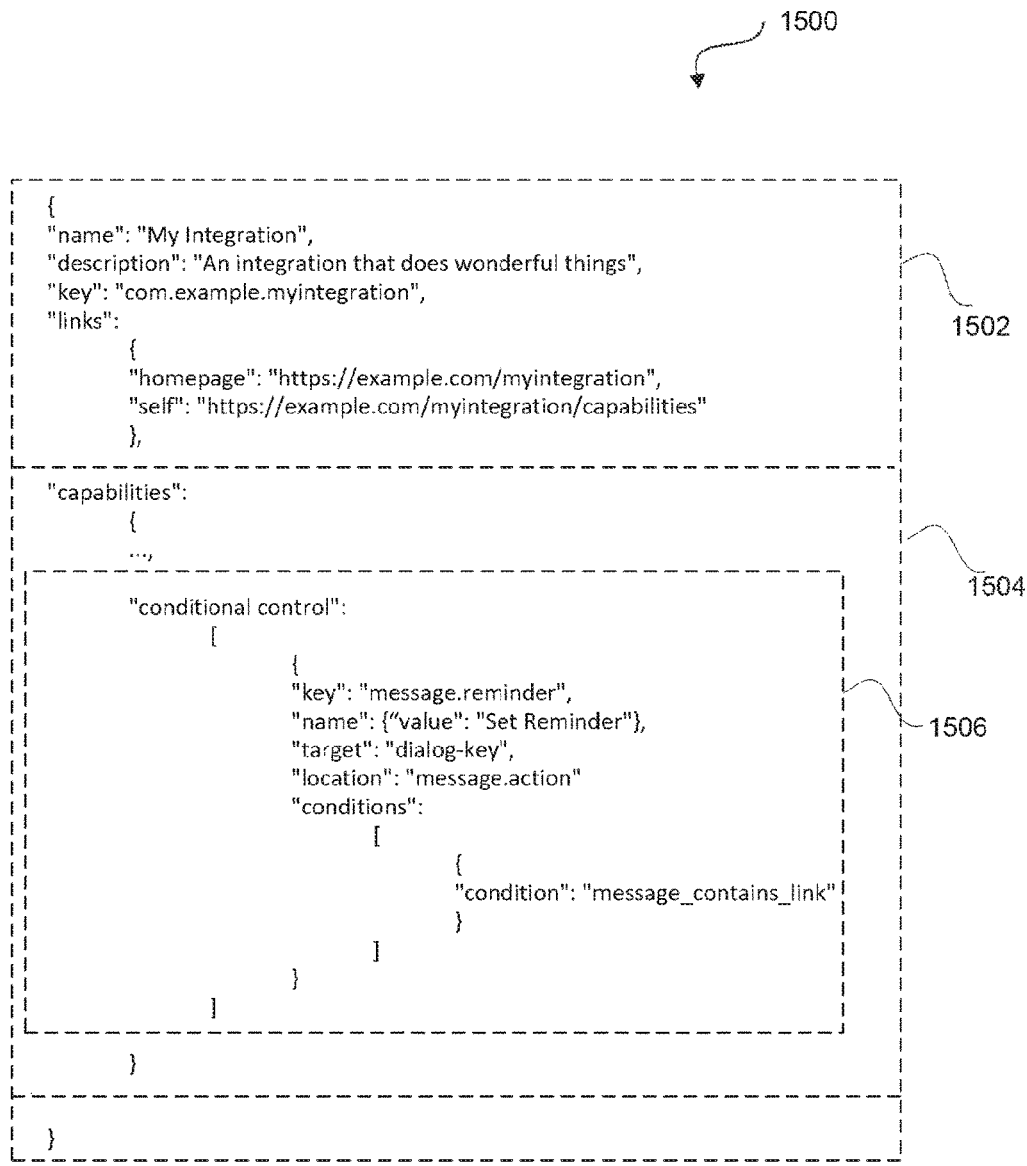
FIG. 15 illustrates an example integration descriptor of an integration which provides a conditional control according to aspects of the present disclosure.

One example of an integration descriptor that defines a conditional control is depicted in FIG. 15. As can be seen in the figure, the descriptor 1500 is similar to descriptor 500 discussed with reference to FIG. 5 above, with portion 1502 providing general information in respect of the integration and portion 1504 defining the capabilities of the integration. In this case the integration supports a conditional control. Accordingly, the capabilities section 1504 includes a conditional control UI extension descriptor 1506.

In this particular example, the conditional control UI extension descriptor 1506 includes: a key, defining a stable technical identifier that can be used internally to identify the element; name information, defining a name of the control (i.e. a label for the control that is displayed); query URL information, defining an endpoint, such as a REST endpoint, exposed by the integration for dynamic content; target information, defining the action to be performed if the conditional control is activated by a user (for example, the target may define a key of a dialog box, a panel, an external page, an external application); a location, defining the object or element of the user interface that the conditional control is to be associated with, e.g. a message, dynamic content item, or related content (in descriptor 1500, the conditional control is defined to be associated with a message); and conditions information defining any conditions associated with the display of the conditional control.

As described previously, the conditions defined in the conditional control UI extension descriptor 1506 may be contextual (i.e., depend on the context or content) or characteristic (i.e., depend on a characteristic, such as recipient, sender, type of room, etc.). Example contextual conditions include: content includes a link, content text includes a matching string, content is a notification, content matches a regular expression, content is of a particular style, a value in the content is lower than or higher than a threshold, etc. Example characteristic conditions include: message sent by a particular user/integration, message sent by an administrator, message sent by a guest user, user is the room owner, admin, or guest, room is a public room or a private room, etc. In descriptor 1500, the conditional control is displayed when a message contains a link.

In order for a client 104 to display conditional controls in a user interface, such as chat interface 1400, an integration which includes conditional controls is installed at/activated by the client 104.

3.2.1 Operation Overview

Figure 16:
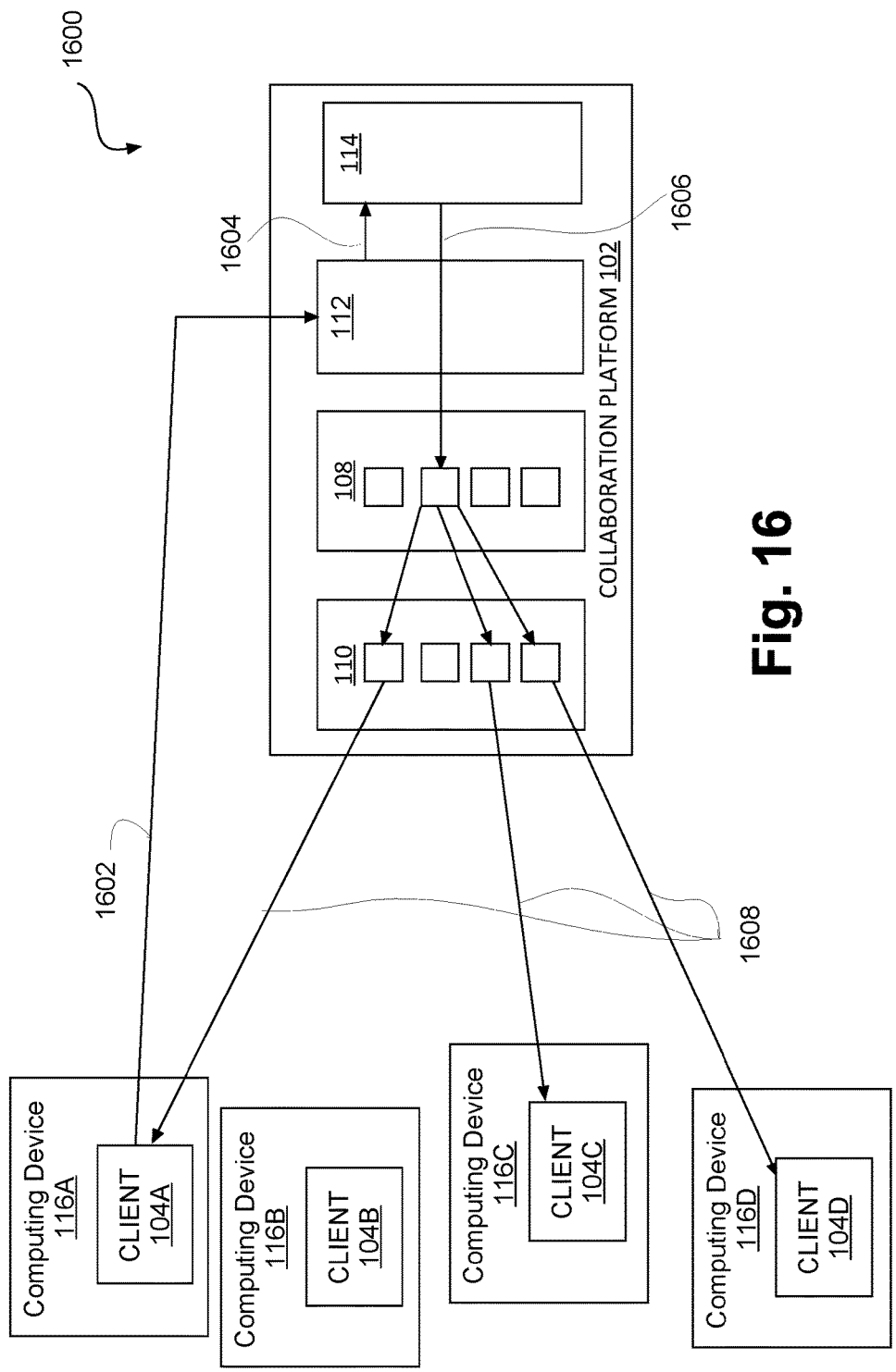
FIG. 16 is a message passing diagram illustrating an exemplary method for displaying conditional controls in a chat interface.

FIG. 16 illustrates a high level message passing diagram for installing integrations with conditional controls in one or more chat groups. Process 1600 of FIG. 16 is similar to process 600 of FIG. 6, with the only difference being that the integration includes one or more conditional controls in addition to or instead of dynamic content items. Accordingly, FIG. 16 uses the same reference numerals as FIG. 6 and the process need not be described again.

3.2.1.1 Collaboration Platform Operation

Figure 17:
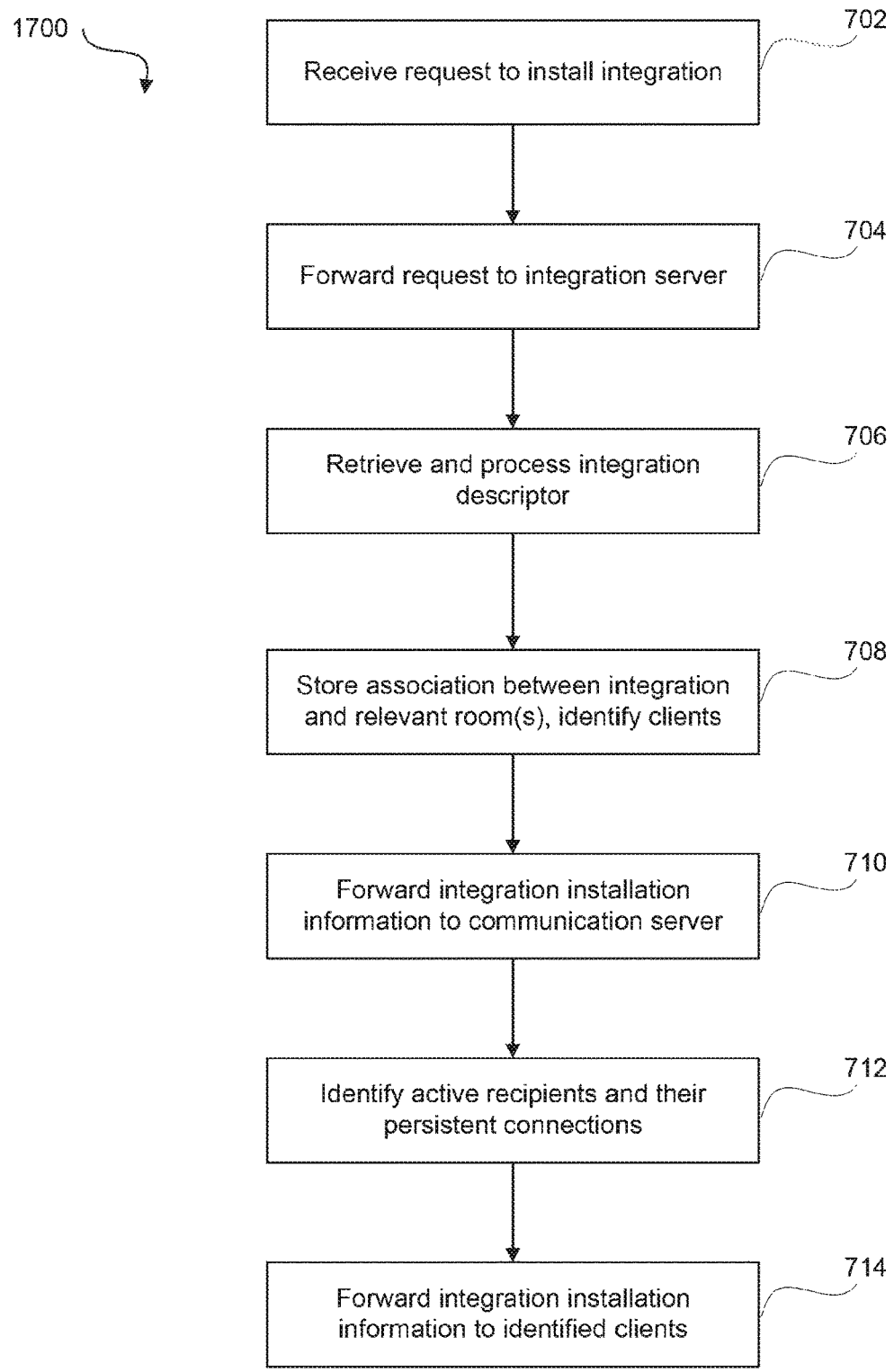
FIG. 17 is a flowchart illustrating an exemplary method performed by a collaboration platform for forwarding an integration descriptor defining a conditional control to a client.

FIG. 17 is a flow chart illustrating an exemplary method 1700 performed by the collaboration platform 102 to install an integration offering a conditional control at a client 104.

Method 1700 is similar to method 700 described previously, with the exception that the integration in question provides one or more conditional controls. Accordingly, FIG. 17 uses the same reference numerals as FIG. 7 and the process need not be described again.

3.2.1.2 Client Operation

Figure 18:
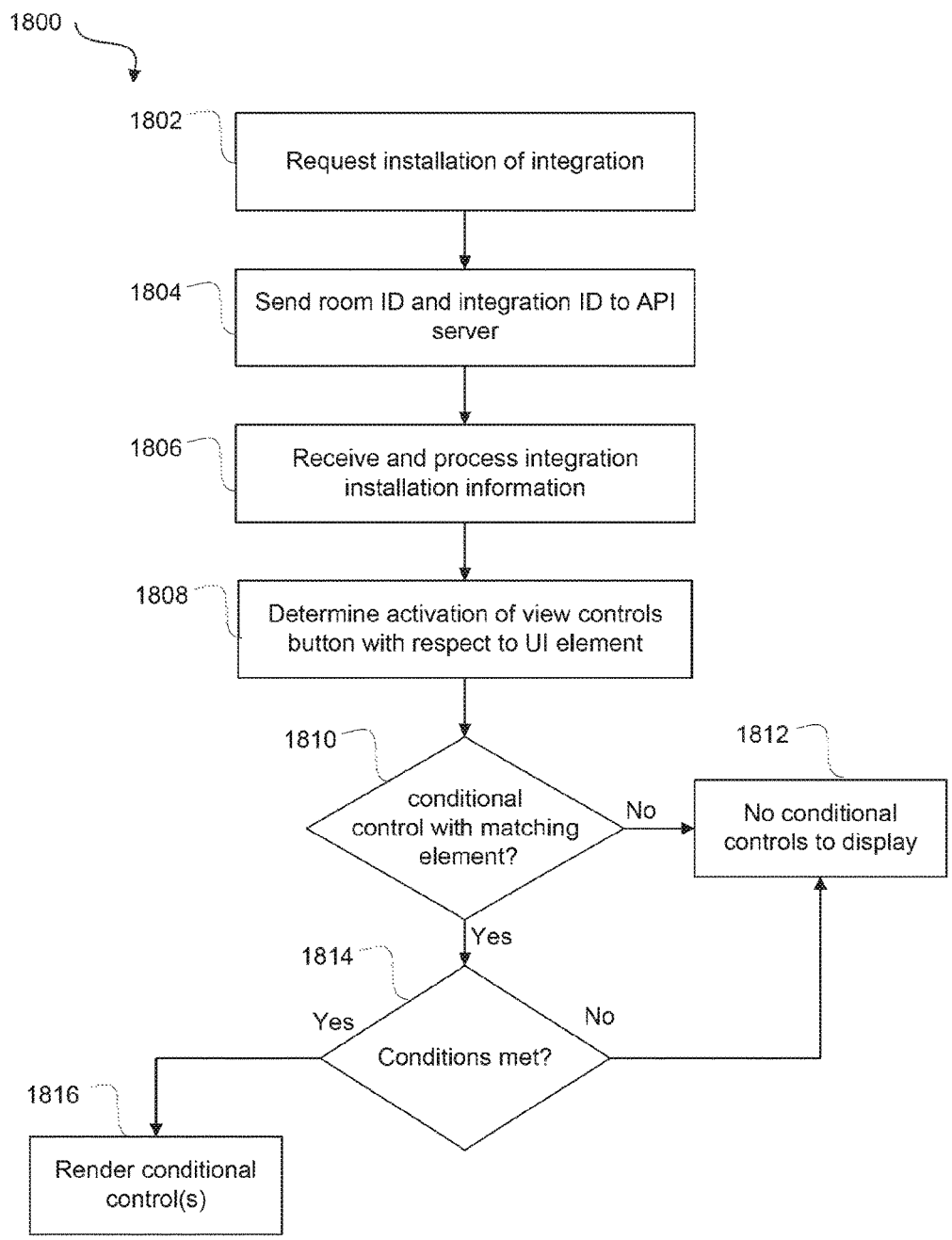
FIG. 18 is a flowchart illustrating an exemplary method performed by a client for displaying a conditional control in a chat interface.

FIG. 18 illustrates an exemplary method 1800 performed by a client to install and run an integration having conditional controls in a particular chat room. It will be appreciated that a similar method can be used to install the integration in another chat room or globally.

Steps 1802, 1804, and 1806 of method 800 are concerned with installation of an integration which provides a conditional control. These steps are similar to steps 802, 804, and 806 of method 800 respectively, and will not be described again.

At 1808, the client 104 detects that a view controls button 1408 has been activated in the chat interface. View controls buttons 1408 are displayed for various UI elements in the chat interface. For example, view controls buttons may be displayed for each message in the chat history, for any dynamic content item (if displayed), and for related content (if displayed).

At 1810, the client 104 determines the type of UI element associated with the activated view controls button 1408 and checks to see if any conditional controls are defined for this type of element for the chat room in question. This may involve, for example, querying data structures stored by the client to identify integrations associated with the room, any conditional controls for those integrations, and (of those conditional controls) any that are associated with the type of element identified.

If, at 1810, no conditional controls associated with the UI element are identified, the method proceeds to 1812. At 1812 the client 104 may alert the user that no conditional controls are available, for example by displaying an empty list of controls (e.g. an empty drop-down menu) or a message such as "no conditional controls available". In certain embodiments activation of a view controls button 1408 may cause client 104 to show both conditional and non-conditional controls (non-conditional controls being controls that are always made available). In this case any non-conditional controls are displayed at 1812.

If, at 1810, one or more conditional controls associated with the UI element are identified, the method proceeds to step 1814. At 1814, the client 104 evaluates the conditions of the identified conditional controls to determine which (if any) conditional controls should be made available to the user. For example, if the user selects a view controls button associated with a message in the chat history, the client 104 determines if the context or characteristic of the message satisfies the contextual and/or characteristic conditions of any of the identified conditional controls.

If, at 1814, the conditions of any of the identified conditional controls are met, the method proceeds to step 1816. At 1816, the client 104 displays each conditional control whose conditions have been met in the user interface.

If none of the identified conditional controls have conditions that are met, the method returns to 1812 and no conditional controls are rendered in the user interface.

3.3 Clauses

Described herein is a computer implemented method for displaying a conditional control in a chat interface running on a client device, the method comprising: receiving, from a collaboration platform, a conditional control descriptor, the conditional control descriptor defining a conditional control, one or more conditions, and an action to be performed on activation of the conditional control; determining whether the one or more conditions are met; and in response to determining that the one or more conditions are met, displaying the conditional control in the chat interface.

The method may further comprise: displaying a view controls button in the chat interface; and detecting activation of the view controls button, and wherein determining whether the one or more conditions are met is performed in response to detecting activation of the view controls button.

The conditional control descriptor may further define an element type that the conditional control is associated with; and the view controls button may be associated with a particular element of the chat interface, the particular element having an element type, and wherein on detecting activation of the view controls button the method may further comprise determining the element type associated with the view controls button; determining if the element type associated with the conditional control matches the element type of the activated view controls button, and wherein determining whether the one or more conditions are met is performed in response to determining that the element type associated with the conditional control matches the element type of the activated view controls button.

The one or more conditions associated with the conditional control may be based the content of the particular element the view controls button is associated with.

The one or more conditions associated with the conditional control may be based the context of the particular element the view controls button is associated with.

The one or more conditions may define a regular expression; and determining whether the one or more conditions are met may comprise determining whether content of the particular element that the view controls button is associated with matches the regular expression.

The conditional control may be associated with a message element type; the one or more conditions may define a regular expression; the view controls button may be associated with a particular message received in the chat interface; and determining whether the one or more conditions are met may comprise determining whether content of the particular message matches the regular expression.

The conditional control descriptor may further comprise a location field specifying a location in the chat interface where the conditional control can be displayed.

In response to determining that the one or more conditions are met, the conditional control may be displayed in a menu of controls together with other, non-conditional controls.

Also described herein is an electronic device configured to operate as a client to a collaboration platform, the computer processing system comprising: one or more processors; a display, a communications interface; and one or more non-transitory computer-readable storage media storing sequences of instructions which, when executed by the one or more processors, cause the one or more processors to perform a method as described in the preceding paragraphs of this section (section 3.3).

Also described herein is non-transient computer readable storage comprising instructions which, when executed by a processor, cause the processor to cause the one or more processors to perform a method as described in the preceding paragraphs of this section (section 3.3).

4. Integration Synchronization

As outlined above, the collaboration platform 102 of the present invention enables content providers 106 to provide integrations which can be installed by clients 104.

In the embodiments described above, integrations are defined by descriptors which can define one or more UI extensions. E.g. descriptor 500 described a dynamic content item (and related content) UI extension, while descriptor 1500 described a conditional control UI extension.

An integration descriptor may define further UI extensions in UI extension descriptors. As one example, an integration descriptor may include a webhook UI extension descriptor defining a webhook UI extension. An example of an integration descriptor that defines a webhook is shown in Table P below:

TABLE P

Example integration descriptor with webhook UI extension

```
{
"name": "My Integration",
"description": "An integration that does wonderful things",
"key": "com.example.myintegration",
"links":
   {
   "homepage": "https://example.com/myintegration",
   "self": "https://example.com/myintegration/capabilities"
   },
"capabilities":
   {
   "dynamic content item 1": [{<dynamic content item detail>}]
   "related content 1": [{<related content detail>}]
   "dynamic content item 2": [{<dynamic content item detail>}]
   "conditional control 1": [{<conditional control detail>}]
   "conditional control 2": [{<conditional control detail>}]
   "conditional control 3": [{<conditional control detail>}]
   "webhook":
```

TABLE P-continued

Example integration descriptor with webhook UI extension

```
      [
         {
         "event": "room_message",
         "pattern": "^\\/hello$",
         "url": "youraddon.com/hello",
         "name": "Hello webhook",
         "authentication": "jwt"
         }
      ]
   }
}
```

The integration descriptor shown in Table P includes two dynamic content item and one related content item UI extensions (details of which have been omitted but have been described above with respect to FIG. 5), three conditional control UI extensions (details of which have been omitted but have been described above with respect to FIG. 15), and one webhook UI extension.

A given integration descriptor may define any number and combination of UI extensions. Furthermore, content providers 106 may, over time, update integrations (in order to add, modify or delete their capabilities) or delete previously offered integrations. For example, content providers 106 may update integrations to add/modify/delete dynamic content items, related content, conditional controls, and/or other UI extensions.

Changes to (or deletion of) a given integration should ideally be relayed to any clients 104 who have that integration installed. In certain embodiments the collaboration platform 102 provides mechanisms for this to ensure that any integrations installed at clients 104 are synchronized with the current states/versions of those integrations. This section describes these mechanisms in two broad categories: server-initiated integration synchronization and client-initiated integration synchronization.

4.1 Context

A collaboration platform 102 may offer services for large numbers of clients 104 and content providers 106. To facilitate operation, and as described above, platform 102 maintains data structures for tracking which integrations have been installed in which rooms (and which users are members of those rooms), and which integrations have been globally installed.

When the content providers 106 update, add or delete integrations or specific capabilities of their integrations, the collaboration platform 102 has to update its own database. As integrations are added, updated and deleted the clients 104 also need to be kept up to date. This will be referred to generally as integration synchronization.

When the collaboration platform manages 102 a small number of clients and content providers, this synchronization may be a relatively simple matter. However, when the collaboration platform manages numerous clients 104 and content providers 106, synchronization can become very complex. This is due to the fact that integrations may be global (i.e. installed at all clients 104) or room based (i.e. installed only at clients 104 that are members of a given room), that any given client may be a member of many different rooms, that each room may have many different integrations etc. Furthermore, clients 104 connect to (and disconnect from) the collaboration platform at different times.

4.2 Implementation

Two broad synchronization processes are described: client-initiated integration synchronization and server-initiated integration synchronization. Client-initiated integration synchronization occurs, for example, when a user opens a chat client or joins a new room. Server-initiated integration synchronization occurs, for example, when an existing integration (i.e. an integration already installed at one or more clients 104) is updated or deleted by the content provider 106 or collaboration platform 102.

In order to facilitate synchronization, each integration is associated with an integration token. An integration token is generated based on the content of the integration using a token generation method that provides a unique token for the integration. Various methods for generating these tokens may be used.

In the present embodiments, an integration token is a hash of information regarding the integration. As described above, when a new integration descriptor is received, or an existing integration is updated, the collaboration platform 102 stores new or updated UI extension descriptors for the UI extensions provided by the integration. These UI extension descriptors (i.e. all current UI extension descriptors for a given integration) are then used to create a token for the integration, e.g. hex (sha-1(UI extension descriptors)).

Any additional detail as desired may be included in input to the token calculations, the goal being to generate a unique descriptor that takes into account any details of the integration that could potentially change (and therefore will result in a different token being generated if any relevant changes to an integration are made). By using UI extension descriptors, the collaboration system 102 can recalculate an integration token any time a content provider 106 updates an integration (using, for example, the API offering provided above) by adding/removing/changing its functionality.

As an alternative example, however, the entire integration description itself could be used to create an integration token for the integration, e.g. hex (sha-1(integration descriptor)). In this case, content providers may simply submit a new integration descriptor when updating an integration (rather than, for example, using the API to modify/update selected portions of an integration).

As described above, integration tokens are stored by the collaboration platform 102, for example in a cache (e.g. a Redis cache) or other database (e.g. database 115). When an integration is installed at a client 104, the integration token for the integration is also communicated to the client 104 (in the integration installation information) and stored on the client's local memory.

In the embodiments described below, room tokens are generated in addition to individual integration tokens. Room tokens provide a unique identifier for the integration state of a room: i.e. the particular integrations installed in a given room and the versions of those integrations. Various methods may be utilized for generating room tokens, but in the present embodiment a room token generated by calculating a hash of the integration tokens of all the integrations installed in the room, such as hex (sha-1(integration tokens)). Room tokens are generated each time the integration state of a room changes—i.e. when an integration is added to or removed from a room, or an integration associated with a room is updated.

To synchronize integrations stored in the memory of a client 104 with the integrations stored in the database 115, the collaboration platform 102 compares tokens stored by the client 104 (received, for example, in a sync request) with the corresponding tokens stored by the collaboration platform 102. If the tokens match, the collaboration platform 102 determines that the client 104 and integration server 114 are synchronized. However, if the tokens do not match, the collaboration platform 102 recognizes that the client 104 is not synchronized with the integration server 114 and sends updated integration information to the client 104.

4.2.1 Client-Initiated Integration Synchronization

Figure 19:
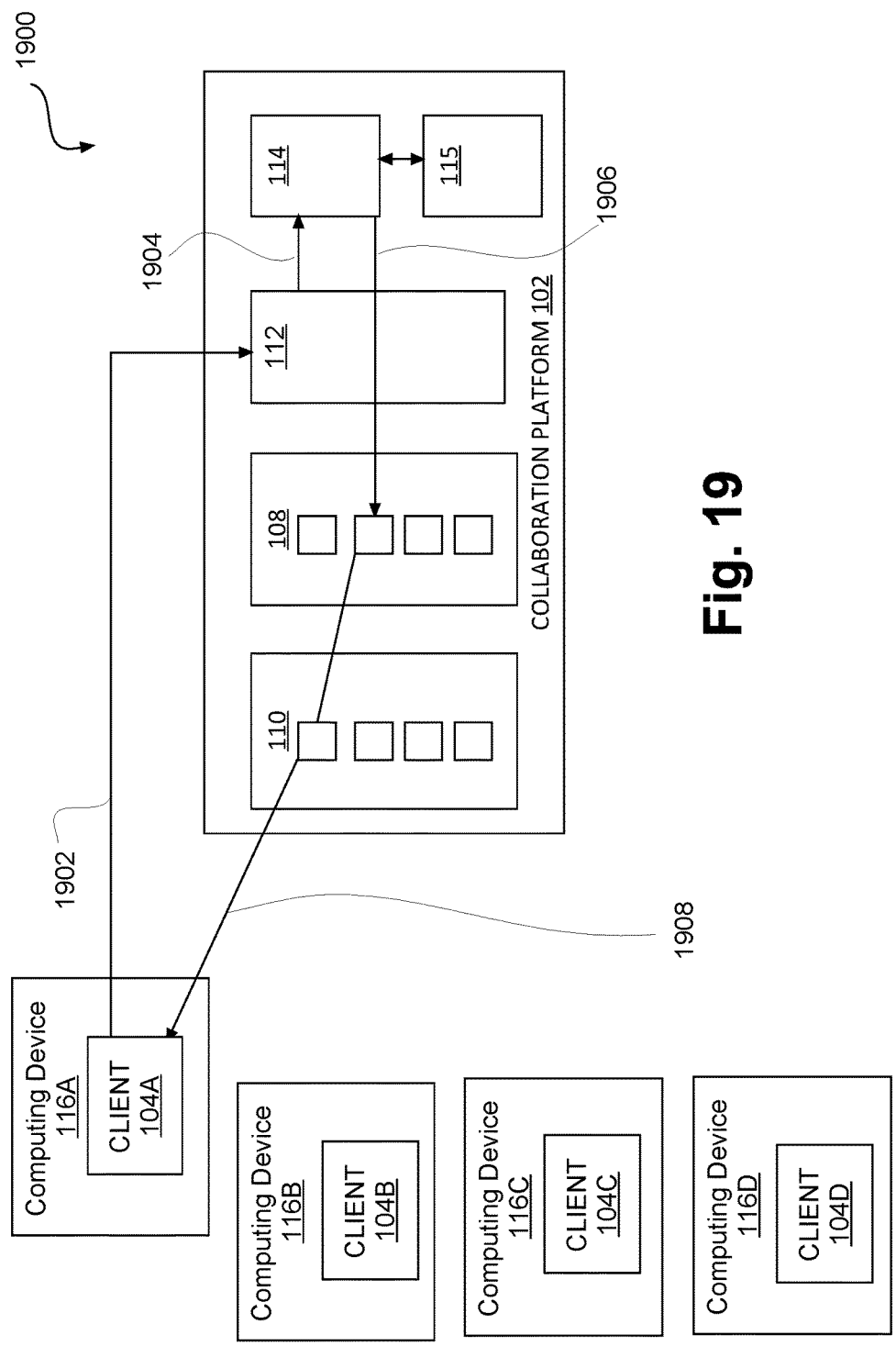
FIG. 19 is a message passing diagram illustrating an exemplary client-initiated integration synchronization process.

FIG. 19 illustrates an exemplary method 1900 for client-initiated synchronization. As described previously, this method may be employed whenever a user opens a chat client 104, or enters a new chat room.

The method begins with a client 104 sending a synchronization request to the API server 110 (as indicated by arrow 1902). The API server 110 forwards the request to the integration server 114 (indicated by arrow 1904).

If the integration server 114 determines that the integration(s) stored by the client 104 are out of date, the integration server 114 generates a synchronization update and forwards this to the API server 110 (indicated by arrow 1906). The API server 110 responds to the client that sent the synchronization request with the synchronization update (indicated by arrow 1908). The client 104 can then update its local memory.

If the integration server 114 determines that the integration(s) stored by the client 104 are up to date, it may either respond with a message to this effect or send no response at all (which is interpreted by the client 104 as indicating the integrations are up to date).

The synchronization steps will be described in detail with reference to FIGS. 20-21.

4.2.1.1 Client Operation

Figure 20:
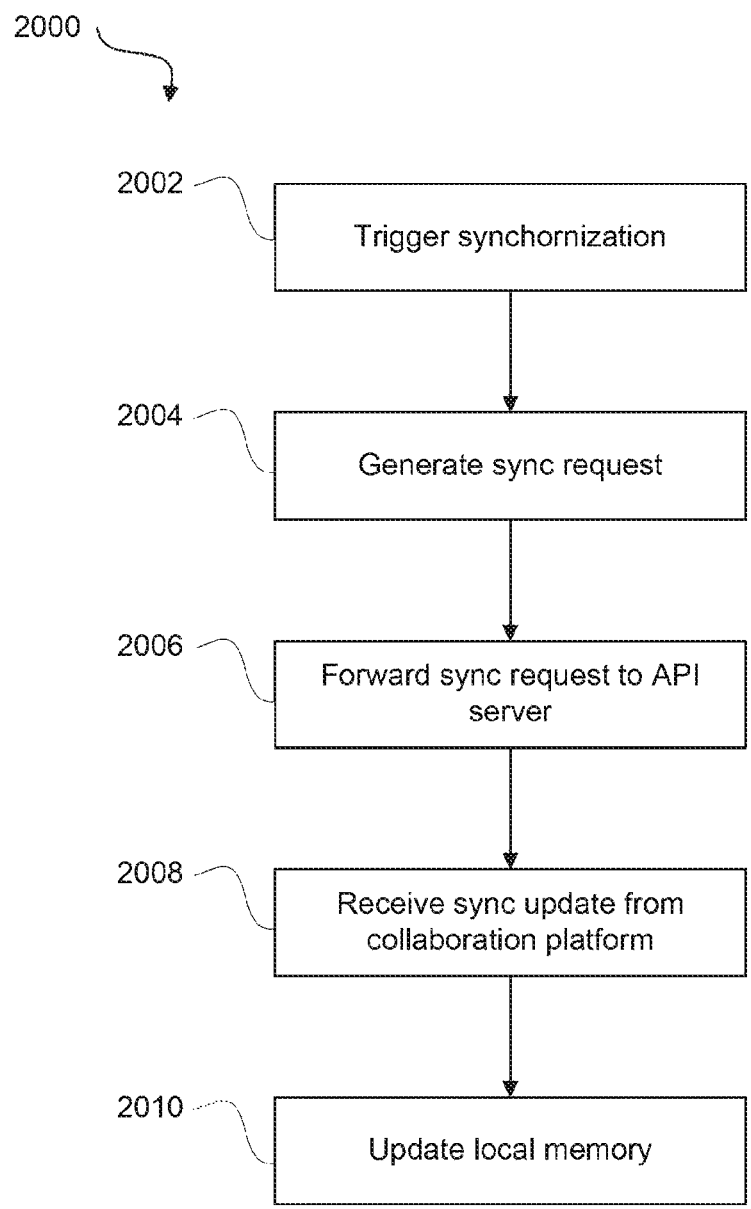
FIG. 20 is flowchart illustrating an exemplary method performed by a client to synchronize integrations installed on the client with a collaboration platform.

FIG. 20 illustrates an exemplary method 2000 performed by a client 104 to synchronize integrations stored in its local memory.

At 2002, the client 104 triggers synchronization. The client 104 may trigger synchronization in various circumstances, for example when the client 104 has just been opened, and when the user enters a new room.

At 2004, the client 104 generates a sync request to update its installed integrations. The data included in the sync request depends on how synchronization was triggered and, accordingly, which integrations the client 104 is requesting synchronization of For example, where a sync request is triggered due to the client 104 having just been opened, the client 104 requests synchronization of all stored integrations, i.e., the integrations in all chat rooms the client is a member of and any global integrations. In this case, the client 104 retrieves the following from local memory for inclusion in the sync request: room identifiers for rooms which the client is a member of; integration identifiers for all integrations installed in those rooms; the integration tokens for those integrations (as received when the integration was installed or last synchronized). Global integrations may be considered to be part of a global room.

As an alternative example, if a sync request is triggered due to a user entering a new room, the client requests synchronization only for the room it has newly entered. To that end, the client 104 retrieves the following from local memory for inclusion in a sync request: the room identifier for the room in question; integration identifiers for the integrations the client 104 has installed in that room; and integration tokens for those integrations. Where a user enters a room but does not have any locally stored integrations for the room, the sync request may be sent without any integration identifiers or integration tokens.

Table Q below provides one example of a synchronization request:

TABLE Q

Example synchronization request

```
{
  "knownIntegrations":
  {
    "global":
    {
      "integration 1": "f224ff3e...",
      "integration 2":"123baa24..."
    },
    "123":
    {
      "integration 1": "7a5233c5..."
    },
    "456":
    {
      "integration 2": "4aaf3e21..."
    }
  }
}
```

In this example, "Global:" indicates the global integrations installed at the client, whereas "123:" and "456:" are the room identifiers of two different rooms.

At 2006, the client 104 forwards the sync request to the API server 112.

At 2008, the client 104 receives a synchronization update from the collaboration platform 102. The synchronization update includes updated integration information in respect of any changed integrations pertinent to the client 104 (in case of opening a chat client) and pertinent to a room (in case a new room is entered). If an integration was uninstalled or deleted since the last synchronization, the synchronization update includes the integration identifier (e.g. key) and a flag indicating that the integration has been deleted. Unchanged integrations are not mentioned in the synchronization update. Table R provides an example of a synchronization update:

TABLE R

Example synchronization update

```
{
  "changedIntegrations":
  {
    "global":
    [
      {
        "integration_key": "integration 1",
        "token": "e672ad23...",
        "name": "My Add-on",
        "ui_extensions":
        [
          {
            "type": "Dynamic content item",
            "key": "my-Dynamic content item",
            "name": "My Panel",
            "Queryurl": "{{localbaseURL}}/Dynamic
              content item",
            "location": "interface.sidebar.right"
            "icon":
            {
              "conditions":[ ]
            }
          }
        ]
      }
    ],
    "123":
    [
```

TABLE R-continued

Example synchronization update

```
      {
        "integration_key": "com.example_integration.hipchat",
        "is_deleted": true
      }
    ],
    "456":
    [ ]
  }
}
```

This example synchronization update includes updated information for one integration, i.e., global integration "integration 1". Accordingly, the client 104 understands that only one integration has been updated since the last synchronization. The synchronization update has also returned a deleted flag for an integration, i.e., integration "com.example_integration.hipchat" in room 123. Accordingly, the client 104 recognizes that that integration should be deleted from room 123. No descriptors are returned for room 456, so the client 104 understands that no changes were made to the integrations of room 456.

At 2010, the client 104 updates the local memory. Specifically, the client replaces existing locally stored integration information with the integration information received in the synchronization update. For example, on receiving the above synchronization update, the client 104 would delete the locally stored information for the integration with the key "integration 1" (both descriptor information and the integration token) and replace it with the "integration 1" information received in the synchronization response. Also, the association between chat room "123" and integration "com.example_integration.hipchat" is deleted.

Once the client 104 has received and processed the synchronization update the client 104 is synchronized. The client 104 can then act on the updated integrations as normal, for example by displaying any dynamic data (as described with reference to steps 808-822 of FIG. 8) and displaying any conditional controls (as described with respect to 1810-1820 of FIG. 18).

4.2.1.2 Collaboration Platform Operation

Figure 21:
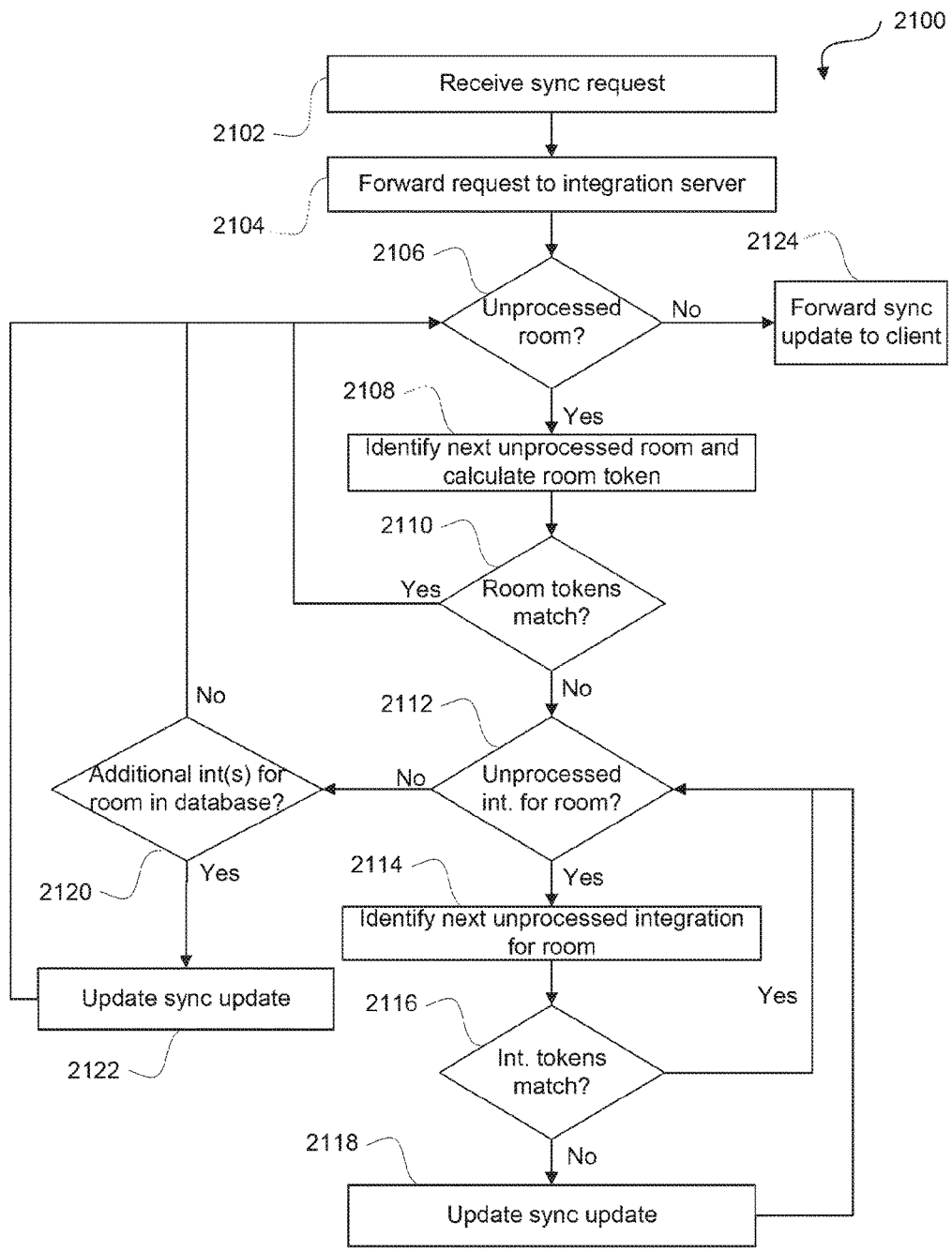
FIG. 21 is a flowchart illustrating an exemplary method performed by a collaboration platform to synchronize integrations installed on a client.

FIG. 21 illustrates an exemplary method 2100 performed by the collaboration platform 102 to respond to a sync request received from a client 104.

At 2102, the API server 112 receives a sync request (as described above) from a client 104.

At 2104, the sync request is forwarded to the integration server 114, which retrieves the integration identifiers, integration tokens, and the room identifiers from the sync request. Using the integration and room identifiers retrieved from the request, the integration server 114 can identify (and retrieve) the corresponding integration tokens and room tokens as stored in database 115.

At 2106, the integration server 114 determines if the sync request includes any room identifiers that have not yet been processed.

If, at 2106, there are any unprocessed rooms, the method proceeds to 2108. At 2108 the integration server 114 identifies the next unprocessed room in the sync request. Initially, the "next" room will be the first room described in the sync request. As method 2100 continues further rooms described in the sync request are considered. Once the next room in the sync request has been identified, the integration server 114 calculates a room token for that room based on the integration tokens for that room as received in the sync request.

At 2110, the integration server 114 compares the room tokens for the room identified at 2108. This involves the integration server 114 comparing the client's version of the room token (as calculated based on the sync request or received in the sync request) and the server's version of the room token (as stored by the integration server 114).

If, at 2110, the room tokens match, the integration server 114 determines that no changes have been made to any of the integrations associated with that room. In this case the method returns to 2106 to see whether further rooms included in the sync request need to be considered.

If, at 2110, the room tokens do not match, the integration server 114 determines that changes have been made to one or more of the integrations associated with that room. In this case the integration server 114 considers the individual integrations for the room in question to determine where the change(s) lie (steps 2112 to 2122).

At 2112, the integration server 114 determines if the sync request includes reference to any integrations for the room currently being considered (i.e. the room last identified at 2108) that have not been processed.

If, at 2112, there are unprocessed integrations for the room in the sync request, the method proceeds to 2114. At 2114 the integration server 114 identifies the next unprocessed integration for the room in question from the sync request. At the start of each room processing loop (i.e. the loop in which the individual integrations for a given room are considered), the "next" integration will be the first integration described for the room in question in the sync request.

At 2116, the integration server 114 compares the integration tokens for the integration identified at 2108 (i.e. compares the integration token as received in the sync request with the corresponding integration token stored by the integration server 114).

If, at 2116, the integration token from the sync request matches a corresponding integration token stored by the integration server 114, the integration server 114 determines that no changes have been made to that particular integration. In this case the method returns to 2112 to see whether further integration tokens in respect of the room in question need to be considered.

If, at 2116, the integration token from the sync request does not match the corresponding integration token stored by the integration server 114, the integration server 114 determines that changes have been made to the integration and the method proceeds to 2118. Integration tokens are considered to not match when: the value of the token received in the sync request is different from the value of the token stored by the integration server 114 (which could occur, for example, if the integration was updated when the client was offline); an integration token received in the sync request has no corresponding token stored by the integration server 114 (which could occur, for example, if the integration was deleted from the room while the client was offline).

At 2118, the integration server 114 updates the synchronization update that is to be sent to the client 104. Where the comparison made at 2116 indicates that the integration has been updated, the integration server 114 retrieves the relevant information for the integration (e.g. the UI extension descriptors) from the database 115 and includes this information (or otherwise flags this information for inclusion in) the synchronization update that will be sent to the client 104. Where the comparison made at 2116 indicates that an integration installed at the client 104 has been deleted, the integration server 114 updates the synchronization update to flag this integration for deletion. Following this the method returns to 2112 to determine if other integrations for the room need to be processed.

If, at 2112, there are no more unprocessed integrations for the room in question in the sync request, the method proceeds to 2120. At 2120, the integration server 114 checks to see if the room in question (i.e. the room last identified at 2108) includes one or more integrations that were not included in the sync request. This may occur, for example, if an integration was added to a room while the client 104 was offline.

If, at 2120, the room in question doesn't have any integrations not included in the sync request, the process returns to 2106 to determine if further rooms need to be considered.

If, at 2120, the room in question does have one or more integrations not included in the sync request, the integration server 114 retrieves information for the integration(s) not included in the sync request from the database 115 and includes this information (or otherwise flags this information for inclusion in) the synchronization update that will be sent to the client 104. Following this, the process returns to 2106 to determine if further rooms need to be considered.

If, at 2106, there are no further rooms to be considered, the method proceeds to 2124. At 2124 the integration server forwards the synchronization update to the API server 104. The synchronization update includes: information in respect of any integrations that been updated or added (per 2118 and 2122) and deletion flags for any integrations that have been deleted (per 2118).

The API server 110 then responds to the client's synchronization request with the synchronization update.

In the method described above, room tokens are used in order to make comparisons at a room-level. This can provide processing efficiencies—for example, if the room token calculated by the integration server 114 based on the sync request matches the room token stored by the integration server 114, then there is no need to consider the individual integrations associated with that room.

In the method described above room tokens are not communicated from the collaboration platform 102 to the clients 104 or, as a result, included in synchronization requests sent by the clients 104. In alternative embodiments, however, this may occur: i.e. room tokens may be communicated to and stored by the clients 104 (e.g. any time an integration is installed or updated), and included in any sync requests communicated by the client 104. In this case the integration server 114 can simply retrieve the relevant room token from the sync request and need not recalculate this based on the integration tokens received in the sync request.

By way of further alternative, when room tokens do not match (at 2110), instead of considering individual integrations within the room to identify specific changes (at steps 2112 to 2122), the integration server 114 may simply prepare the synchronization update to include current information on all integrations for the room in question. In this case individual integration tokens for the room in question need not be compared (i.e. steps 2112 to 2122 are omitted).

4.2.2 Server-Initiated Integration Synchronization

As described previously, in some cases, such as when a new integration is added or deleted by another person in a user's group, the collaboration platform 102 pushes updated integration information to the clients 104 who are members of that group. Furthermore, if an integration is updated while a client which has that integration is connected, the collaboration platform 102 may push the updated integration information directly to the client 104. In these cases the synchronization can be pushed to multiple clients simultaneously, whereas in the client-initiated synchronization described above the synchronization information (in the synchronization update) is forwarded to the requesting client 104 only. This section describes the high-level process of updating connected clients 104 when an integration pertinent to them changes.

Figure 22:
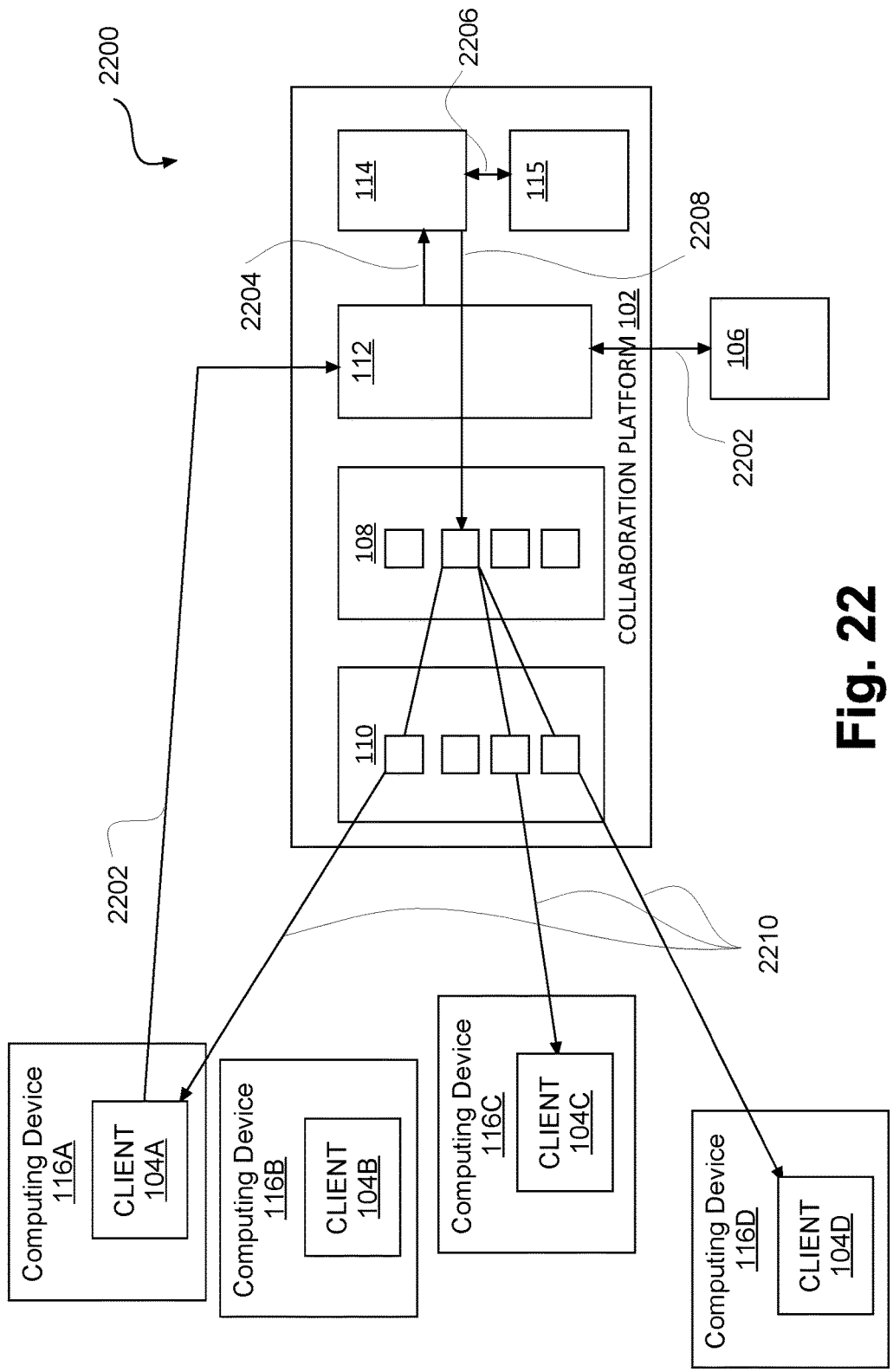
FIG. 22 is a message passing diagram illustrating an exemplary server-initiated integration synchronization process.

FIG. 22 illustrates an exemplary method 2200 for server-initiated integration synchronization. This method is employed whenever a client 104 installs a room or global integration, or a content provider 106 updates an integration.

The method begins when the API server 112 receives a notification that triggers a server-initiated synchronization (indicated by arrows 2202). A notification may be received from a client 104 when the client makes a request to add or delete an integration from a room or to add or delete a global integration. A notification may be received from a content provider 106 when an integration is updated or deleted.

The API server 112 receives the notification and passes it to the integration server (indicated by arrow 2204). The integration server 114 updates the database 115 (as indicated by arrow 2206). The integration server 114 also generates a synchronization update with the required update. This update is forwarded to the communication server 108 along with a list of recipients (indicated by arrow 2208). The communication server forwards the synchronization update to the active recipients (indicated by arrow 2210). The clients 104 subsequently store the update and render the updates (if required).

This process will be described in detail with reference to FIGS. 23-24.

4.2.2.1 Collaboration Platform Operation

Figure 23:
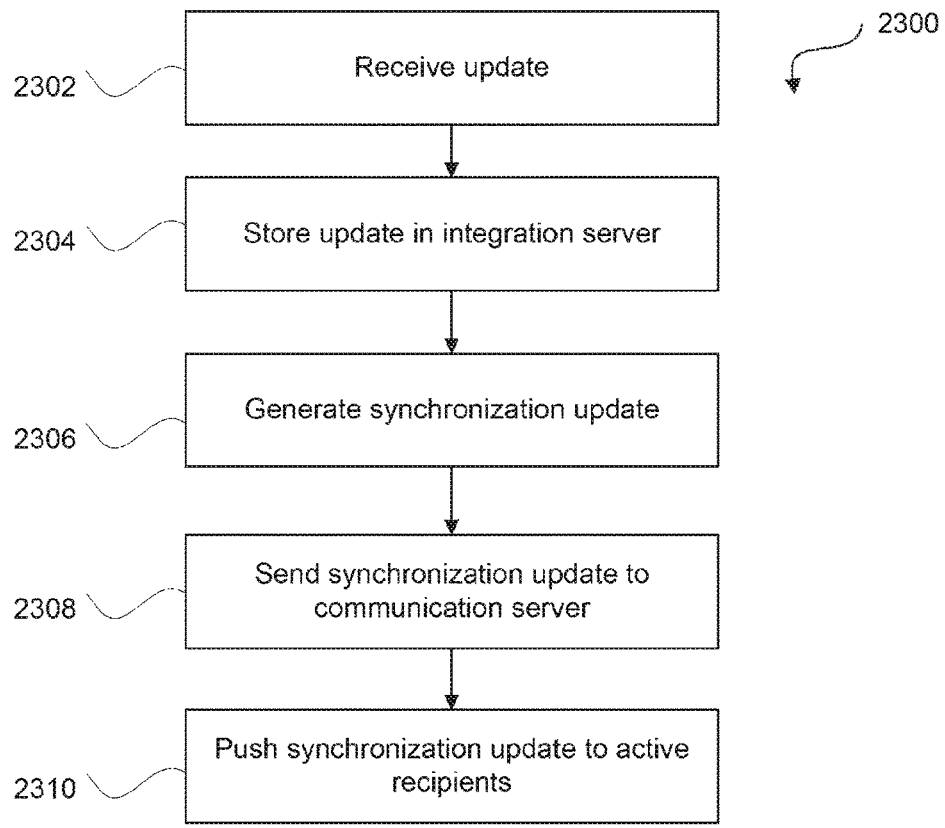
FIG. 23 is a flowchart illustrating an exemplary method performed by a collaboration platform to synchronize integrations installed on a client.

FIG. 23 illustrates an exemplary method 2300 performed by the collaboration platform 102 to push synchronization information to active clients.

At 2302, the API server 112 receives a notification from either a client 104 or a content provider 106. As described previously, the notification originates from the client or the content provider in different situations. Generally, speaking, the notification informs the collaboration platform 102 that an integration is added to or removed from a room or globally (i.e., when the notification is sent by a client 104) or that a content provider has updated or deleted an integration (when the notification is sent by the content provider). Table S below provides one example of a notification which has a similar format to the sync request described above, but is embedded in an XMPP message:

TABLE S

Example notification

```
<body xmlns='http://jabber.org/protocol/httpbind'>
   <iq xmlns='jabber:client'to='3_4@chat.devvm.hipchat.com/web||
   proxy|devvm.hipchat.com|5222' type='set'>
   <query xmlns='http://hipchat.com/protocol/integrations'
   format='json'>
     {"changedIntegrations": {"123": [list of content items]}}
   </query>
   </iq>
</body>
```

In this example, the "changedIntegrations" element has the same structure as in the sync request example described above.

At 2304, the API server 112 forwards this notification to the integration server 114 which updates the database 115 accordingly. Depending on the nature of the notification, this may involve, for example: associating one or more integrations with an existing chat room and generating a replacement room token for that room (e.g. if a client 104 requests an integration to be added to a room); disassociating one or more integrations with a chat room and generating a replacement room token for that room (e.g. if a client 104 requests an integration to be removed from a room or a content provider 106 deletes an integration); updating existing integration information with updated integration information, generating a replacement integration token for the integration, and generating replacement room tokens for any rooms the integration is installed in (e.g. if a content provider 106 provides an updated integration).

At 2306, the integration server 114 generates a synchronization update that includes details with respect to the updated integration(s). The synchronization update may have the same or a similar form as the synchronization update described in Table R above.

At 2308, the integration server 114 forwards the synchronization update to the communication server 108, along with a list of recipients that the update is to be sent to. If the update is for a particular room, the integration server 114 identifies the members of the room (e.g. from the room/user table) and forwards this list to the communication server 108. Alternatively, if the update is for a particular integration, the integration server 114 identifies all the rooms which have installed that integration and all the members of those rooms (e.g. from the room/integration table) and forwards this list to the communication server 108.

At 2310, the communication server 108 determines which recipients in the list are currently connected (by performing a lookup in the connections table) and identifies the persistent connections of those clients. It then forwards the synchronization update to the identified persistent connections.

4.2.2.2 Client Operation

Figure 24:
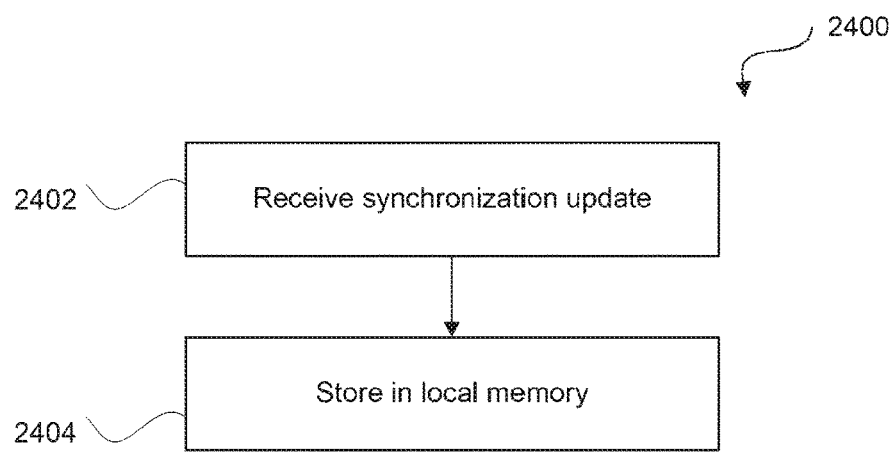
FIG. 24 is a flowchart illustrating an exemplary method performed by a client to synchronize integrations installed on the client.

FIG. 24 illustrates an exemplary method performed by a client 104 to receive client-initiated synchronizations.

At 2402, the client 104 receives a synchronization update from the collaboration platform 102.

The client 104 processes the synchronization update to extract the relevant information and stores this in local memory at 2404. For example: if an integration is updated, the integration descriptor and corresponding token are extracted from the synchronization update and stored in the integration table; if an integration is removed from a particular chat room, the integration table is updated by removing that particular chat room from the corresponding integration entry in the table; if a global integration is removed, the entire integration entry is deleted from the integration table; if a new integration is installed for the first time, a new entry is created in the integration table; if an integration is installed in a new chat room but was already installed for another chat room, the integration entry is updated to include the new chat room's identifier.

Once the client 104 has received and processed the synchronization update the client 104 is synchronized. The client 104 can then act on the updated integrations as normal, for example by displaying any dynamic data (as described with reference to steps 808-822 of FIG. 8) and displaying any conditional controls (as described with respect to 1810-1820 of FIG. 18).

4.3 Clauses

Described herein is a computer implemented method for operating a collaboration system to synchronize integrations installed on a client device with integrations stored by the collaboration system, the method comprising: receiving a synchronization request from the client device, the synchronization request including integration details with respect to one or more integrations installed on the client device, the integration details for each integration included in the synchronization request comprising: an integration identifier identifying the integration; and a client integration token, the client integration token being a unique descriptor of a particular version of the integration installed on the client device; and for a given integration included in the synchronization request, the method further comprises: retrieving a system integration token based on the given integration identifier, the system integration token being a unique descriptor of a current version of the integration identified by the given integration identifier; comparing the client integration token associated with the given integration identifier with the system integration token associated with the given integration identifier; and responsive to determining that the client integration token associated with the given integration identifier does not match the system integration token associated with the given integration: determining the client to be out of date with respect to the given integration; and sending an integration update to the client device, the integration update including information with respect to the current version of the given integration.

The integration token for an integration may be calculated based on information from an integration descriptor of that integration, the integration descriptor of the integration describing one or more user interface extensions provided by the integration.

The integration token for an integration may be calculated using a hash function.

An integration descriptor may include one or more user interface extension descriptors, each user interface extension descriptor defining a user interface extension offered by the integration; and the integration token for an integration may be calculated based on the one or more user interface extension descriptors for that integration.

The integration token for an integration may be a hash function of the one or more user interface extension descriptors for that integration.

A client integration token received in the synchronization request may be calculated by the collaboration platform system and communicated to the client device on installation of the integration by the client.

The integration update sent to the client device may include an integration token in respect of the current version of the given integration.

The integration request may further comprise at least one room identifier identifying a particular room, each room identifier being associated with one or more integrations installed by the client device in that room, and for a given room identifier the method further comprises: retrieving, from the synchronization request, client integration tokens for all integrations associated with the given room identifier in the synchronization request; calculating a client room token based on the client integration tokens retrieved from the synchronization request; retrieving a system room token associated with the given room identifier, the system room token being a unique descriptor of a current integration state of the room, the current integration state of the room including particular versions of particular integrations that should be installed in the room; comparing the client room token associated with the given room identifier with the system room token associated with the given room identifier; and responsive to determining that the client room token associated with the given room identifier matches the system room token associated with the given room, determining that all integrations associated with the given room identifier are up to date.

Responsive to determining that the client room token associated with the given room identifier does not match the system room token associated with the given room, the method may further comprise: determining at least one integration associated with the given room identifier is not up to date; and sending an integration update to the client device, the integration update including information with respect to the current versions of the integrations associated with the given room identifier.

Responsive to determining that the client room token associated with the given room identifier does not match the system room token associated with the given room, the method may further comprise: determining at least one integration associated with the given room identifier is not up to date; determining, using integration tokens of integrations associated with the given room identifier, the one or more integrations associated with the given room that are not up to date; and sending an integration update to the client device, the integration update including information with respect to the current versions of the integrations associated with the given room identifier that were determined not to be up to date.

Also described herein is a collaboration system comprising: one or more processors; a display, a communications interface; and one or more non-transitory computer-readable storage media storing sequences of instructions which, when executed by the one or more processors, cause the one or more processors to perform a method as described in the preceding paragraphs of this section (section 4.3).

Also described herein is non-transient computer readable storage comprising instructions which, when executed by a processor, cause the processor to perform a method as described in the preceding paragraphs of this section (section 4.3).

5. Hardware Overview

In certain embodiments, the techniques and methods described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement the techniques.

Figure 25:
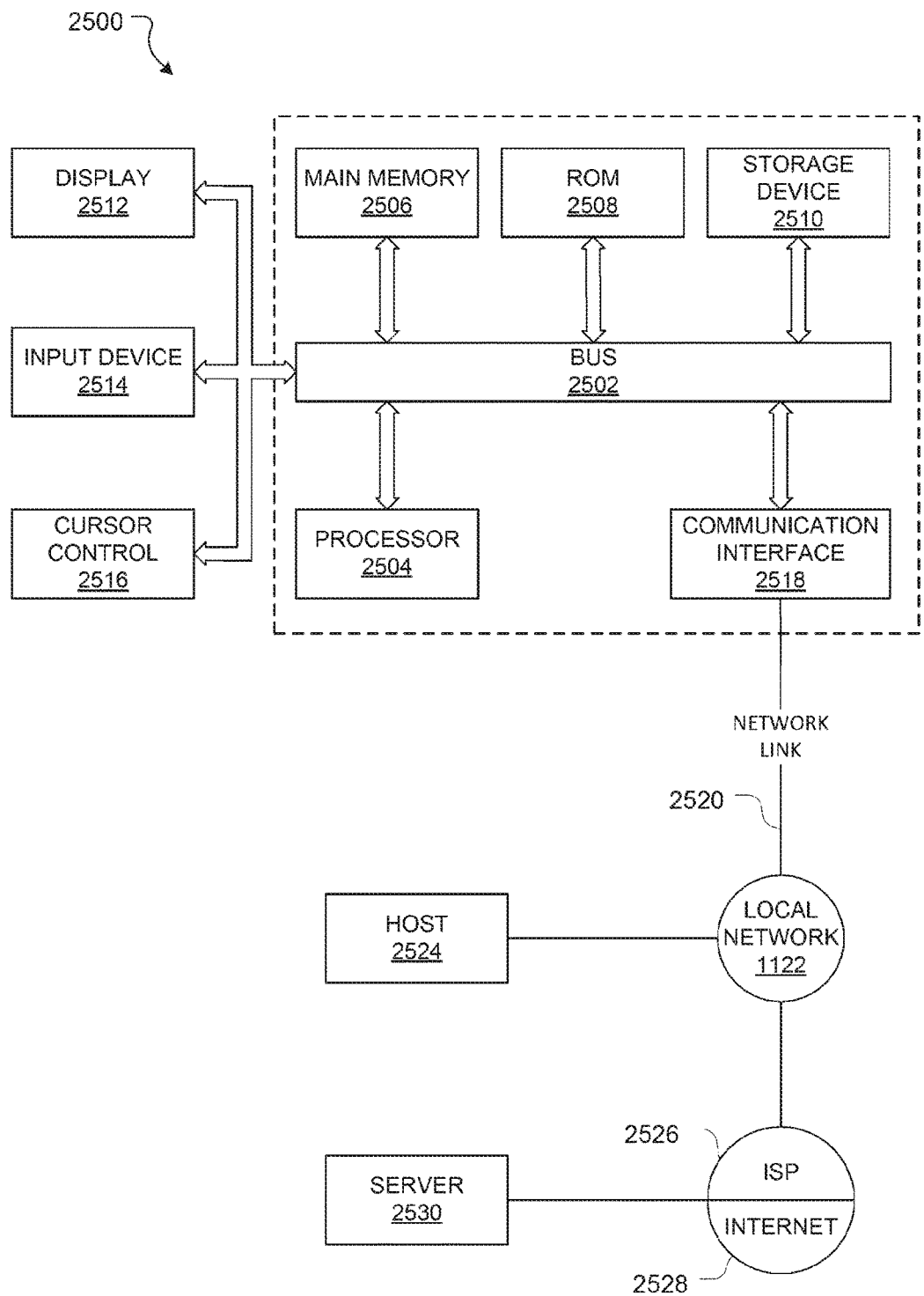
FIG. 25 is a block diagram of an exemplary computing system with which various embodiments of the present disclosure may be used.

For example, FIG. 25 is a block diagram that illustrates a computer system 2500 upon which an embodiment of the invention may be implemented. Computer system 2500 includes a bus 2502 or other communication mechanism for communicating information, and a hardware processor 104 coupled with bus 2502 for processing information. Hardware processor 2504 may be, for example, a general purpose microprocessor.

Computer system 2500 also includes a main memory 2506, such as a random access memory (RAM) or other dynamic storage device, coupled to bus 2502 for storing information and instructions to be executed by processor 2504. Main memory 2506 also may be used for storing temporary variables or other intermediate information during execution of instructions to be executed by processor 2504. Such instructions, when stored in non-transitory storage media accessible to processor 2504, render computer system 2500 into a special-purpose machine that is customized to perform the operations specified in the instructions.

Computer system 2500 further includes a read only memory (ROM) 2508 or other static storage device coupled to bus 2502 for storing static information and instructions for processor 2504. A storage device 2510, such as a magnetic disk or optical disk, is provided and coupled to bus 2502 for storing information and instructions.

Computer system 2500 may be coupled via bus 102 to one more output devices such as a display 2512 for displaying information to a computer user. Display 2512 may, for example, be a cathode ray tube (CRT), a liquid crystal display (LCD), a light emitting diode (LED display), or a touch screen display. An input device 2514, including alphanumeric and other keys, may be coupled to bus 2502 for communicating information and command selections to processor 2504. Another type of user input device is cursor control 2516, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that permits the device to specify positions in a plane. Additional and/or alternative input devices are possible, for example touch screen displays.

Computer system 2500 may implement the techniques described herein using customized hardwired logic, one or more ASICs or FPGAs, firmware and/or program logic which in combination with the computer system causes or programs computer system 2500 to be a special-purpose machine. According to one embodiment, the techniques herein are performed by computer system 2500 in response to processor 2504 executing one or more sequences of one or more instructions contained in main memory 106. Such instructions may be read into main memory 106 from another storage medium, such as storage device 2510. Execution of the sequences of instructions contained in main memory 2506 causes processor 2504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2510. Volatile media includes dynamic memory, such as main memory 2506. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2502. Transmission media can also take the form of acoustic or light waves, such as those generated during radio-wave and infra-red data 5 communications.

Various forms of media may be involved in carrying one or more sequences of one or more instructions to processor 2504 for execution. For example, the instructions may initially be carried on a magnetic disk or solid state drive of a remote computer. The remote computer can load the instructions into its dynamic memory and send the instructions over a telephone line using a modem. A modem local to computer system 2500 can receive the data on the telephone line and use an infra-red transmitter to convert the data to an infra-red signal. An infra-red detector can receive the data carried in the infra-red signal and appropriate circuitry can place the data on bus 2502. Bus 2502 carries the data to main memory 2506, from which processor 2504 retrieves and executes the instructions. The instructions received by main memory 2506 may optionally be stored on storage device 2510 either before or after execution by processor 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card, cable modem, satellite modem, or a modem to provide a data communication connection to a corresponding type of telephone line. As another example, communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a client computer 2524 or to data equipment operated by an Internet Service Provider (ISP) 2526. ISP 2526 in turn provides data communication services through the world wide packet data communication network now commonly referred to as the "Internet" 2528. Local network 2522 and Internet 2528 both use electrical, electromagnetic or optical signals that carry digital data streams. The signals through the various networks and the signals on network link 2520 and through communication interface 2516, which carry the digital data to and from computer system 2500, are example forms of transmission media.

Computer system 2500 can send messages and receive data, including program code, through the network(s), network link 2520 and communication interface 2518. In the Internet example, a server 2530 might transmit a requested code for an application program through Internet 2528, ISP 2526, local network 2522 and communication interface 2518.

The received code may be executed by processor 2504 as it is received, and/or stored in storage device 2510, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example, computing device 116 may be a desktop computer, a laptop computer, a notebook computer, a tablet computer, a smart phone, or other another computer. Similarly, the functions of the collaboration platform 102 may be performed by one or more server computers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method for operating a collaboration system, the method comprising:
receiving, from a content provider, an initial integration descriptor in respect of an integration;
generating an integration identifier for the integration;
generating an initial integration token for the integration, the initial integration token uniquely identifying the initial version of the integration;
associating, in one or more data structures, the integration identifier with the initial integration descriptor and the initial integration token;
receiving, from a client, an installation request to install the integration in one or more rooms; and
installing the integration in the one or more rooms, wherein installing the integration in the one or more rooms comprises:
identifying, from the installation request, the one or more rooms in which the integration is to be installed;
associating, in the one or more data structures, the integration with each of the one or more rooms identified;
receiving an updated integration descriptor in respect of the integration;
generating an updated integration token for the integration, the updated integration token uniquely identifying the updated version of the integration;
updating the one or more data structures to associate the integration identifier with the updated integration descriptor and the updated integration token;
synchronizing one or more client devices with the updated integration.

2. The computer implemented method of claim 1, wherein installing the integration further comprises:
identifying one or more members of the one or more rooms identified; and
communicating, to client devices of each of the one or more members identified, the initial integration descriptor.

3. The computer implemented method of claim 1, wherein the initial integration token is calculated using information in the initial integration descriptor.

4. The computer implemented method of claim 1, wherein the initial integration descriptor comprises one or more user interface extension descriptors, and wherein the initial integration token is calculated based on the one or more user interface extension descriptors.

5. The computer implemented method of claim 1, wherein for each of the one or more rooms in which the integration is to be installed the method further comprises:
calculating a room token for the room, the room token uniquely identifying an integration state of the room, the integration state of the room being defined by integrations and versions of those integrations installed in the room; and
associating, in the one or more data structures, the room token with the room.

6. The computer implemented method of claim 5, wherein the room token for a given room is calculated based on integration tokens of all integrations installed in that given room.

7. The computer implemented method of claim 1, wherein synchronizing one or more client devices with the updated integration comprises:
identifying one or more rooms in which the integration is installed;
identifying one or more members of the one or more rooms in which the integration is installed; and
communicating an integration update to client devices of the one or more members identified.

8. The computer implemented method of claim 7, wherein the one or more members identified are members with client devices that have a current connection with the collaboration system.

9. The computer implemented method of claim 1, wherein on receiving the updated integration descriptor in respect of the integration the method further comprises:
identifying one or more rooms in which the integration is installed and, for each identified room:
generating an updated room token, the updated room token uniquely identifying an integration state of the room, the integration state of the room being defined by the integrations and versions of those integrations installed in the room; and updating the one or more data structures to associate the room with the updated room token.

10. A collaboration system comprising:
one or more processors;
a communications interface; and
one or more non-transitory computer-readable storage media storing sequences of instructions which, when executed by the one or more processors, cause the one or more processors to:
receive, from a content provider via the communications interface, an initial integration descriptor in respect of an integration;
generate an integration identifier for the integration;
generate an initial integration token for the integration, the initial integration token uniquely identifying the initial version of the integration;
associate, in one or more data structures, the integration identifier with the initial integration descriptor and the initial integration token;
receive, from a client, an installation request to install the integration in one or more rooms; and
install the integration in the one or more rooms, wherein installing the integration in the one or more rooms comprises:
identifying, from the installation request, the one or more rooms in which the integration is to be installed;
associating, in the one or more data structures, the integration with each of the one or more rooms identified;
receive an updated integration descriptor in respect of the integration;
generate an updated integration token for the integration, the updated integration token uniquely identifying the updated version of the integration;
update the one or more data structures to associate the integration identifier with the updated integration descriptor and the updated integration token;
synchronize one or more client devices with the updated integration.

11. The collaboration system of claim 10, wherein installing the integration further comprises:
identifying one or more members of the one or more rooms identified; and
communicating, to client devices of each of the one or more members identified, the initial integration descriptor.

12. The collaboration system of claim 10, wherein the initial integration token is calculated using information in the initial integration descriptor.

13. The collaboration system of claim 10, wherein the initial integration descriptor comprises one or more user interface extension descriptors, and wherein the initial integration token is calculated based on the one or more user interface extension descriptors.

14. The collaboration system of claim 10, wherein when executed by the one or more processors the sequences of instructions further cause the one or more processors to, for each of the one or more rooms in which the integration is to be installed:
calculate a room token for the room, the room token uniquely identifying an integration state of the room, the integration state of the room being defined by integrations and versions of those integrations installed in the room; and
associate, in the one or more data structures, the room token with the room.

15. The collaboration system of claim 14, wherein the room token for a given room is calculated based on integration tokens of all integrations installed in that given room.

16. The collaboration system of claim 10, wherein synchronizing one or more client devices with the updated integration comprises:
identifying one or more rooms in which the integration is installed;
identifying one or more members of the one or more rooms in which the integration is installed; and
communicating an integration update to client devices of the one or more members identified.

17. The collaboration system of claim 16, wherein the one or more members identified are members with client devices that have a current connection with the collaboration system.

18. The collaboration system of claim 10, wherein on receiving the updated integration descriptor in respect of the integration the sequences of instructions further cause the one or more processors to:
identify one or more rooms in which the integration is installed and, for each identified room:
generate an updated room token, the updated room token uniquely identifying an integration state of the room, the integration state of the room being defined by the integrations and versions of those integrations installed in the room; and
update the one or more data structures to associate the room with the updated room token.

19. Non-transient computer readable storage comprising instructions which, when executed by a processor, cause the processor to:
receive, from a content provider via the communications interface, an initial integration descriptor in respect of an integration;
generate an integration identifier for the integration;
generate an initial integration token for the integration, the initial integration token uniquely identifying the initial version of the integration;
associate, in one or more data structures, the integration identifier with the initial integration descriptor and the initial integration token;
receive, from a client, an installation request to install the integration in one or more rooms; and
install the integration in the one or more rooms, wherein installing the integration in the one or more rooms comprises:
identifying, from the installation request, the one or more rooms in which the integration is to be installed;
associating, in the one or more data structures, the integration with each of the one or more rooms identified;
receiving an updated integration descriptor in respect of the integration;
generating an updated integration token for the integration, the updated integration token uniquely identifying the updated version of the integration;
updating the one or more data structures to associate the integration identifier with the updated integration descriptor and the updated integration token;
synchronizing one or more client devices with the updated integration.

* * * * *